(12) United States Patent
Tsai et al.

(10) Patent No.: US 11,183,957 B2
(45) Date of Patent: Nov. 23, 2021

(54) MOTOR CONTROLLER AND MOTOR CONTROL METHOD

(71) Applicant: Midastek Microelectronics Inc., Taipei (TW)

(72) Inventors: Ming-Hung Tsai, Taipei (TW); Chung-Ping Tan, Taipei (TW); Wei-Tien Chen, Taipei (TW)

(73) Assignee: Midastek Microelectronics Inc., Taipei (TW)

( * ) Notice: Subject to any disclaimer, the term of this patent is extended or adjusted under 35 U.S.C. 154(b) by 0 days.

(21) Appl. No.: 16/744,192

(22) Filed: Jan. 16, 2020

(65) Prior Publication Data

US 2021/0075353 A1    Mar. 11, 2021

(30) Foreign Application Priority Data

Sep. 5, 2019    (TW) .................................. 108132052

(51) Int. Cl.
*H02P 6/04*    (2016.01)
*H02P 21/09*    (2016.01)
*H02P 21/18*    (2016.01)
*H02P 21/22*    (2016.01)
*H02P 27/12*    (2006.01)

(52) U.S. Cl.
CPC .............. *H02P 21/09* (2016.02); *H02P 21/18* (2016.02); *H02P 21/22* (2016.02); *H02P 27/12* (2013.01)

(58) Field of Classification Search
CPC .. H02P 6/04; H02P 21/09; H02P 21/18; H02P 21/22; H02P 27/12
See application file for complete search history.

(56) References Cited

U.S. PATENT DOCUMENTS

| 2013/0231891 | A1* | 9/2013 | Long | H02P 21/13 |
| | | | | 702/145 |
| 2016/0087563 | A1* | 3/2016 | Magee | H02P 6/182 |
| | | | | 318/400.34 |
| 2018/0131305 | A1* | 5/2018 | Wang | H02P 6/04 |

* cited by examiner

*Primary Examiner* — Cortez M Cook
(74) *Attorney, Agent, or Firm* — JCIPRNET

(57) ABSTRACT

A motor control method is provided. The method includes: receiving a plurality of voltage control signals from a rotation speed controller to output a plurality of PWM signals; receiving the plurality of PWM signals to output three phase currents, so that a motor rotates; sensing three phase current values of the three phase currents; directly calculating a real rotor angle of the motor according to two of the three phase current values; and adjusting the plurality of the outputted voltage control signals according to an expected rotor speed and the calculated real rotor angle, so as to make the real rotor speed of the motor reach the expected rotor speed.

9 Claims, 17 Drawing Sheets

MOTOR CONTROLLER AND MOTOR CONTROL METHOD

CROSS-REFERENCE TO RELATED APPLICATION

This application claims the priority benefit of Taiwan application serial no. 108132052, filed on Sep. 5, 2019. The entirety of the above-mentioned patent application is hereby incorporated by reference herein and made a part of this specification.

BACKGROUND OF THE INVENTION

1. Field of the Invention

The invention relates to a control method, and in particular, to a motor controller of a three-phase alternating current motor that is adapted for a non-address sensor and a motor control method used for the motor controller.

2. Description of Related Art

In a conventional three-phase alternating current control method, if a current rotor angle (a rotor address/position) of a motor is required to adjust a rotor speed of the three-phase alternating current motor, a rotor address sensor (also referred to as a rotor angle sensor or an address sensor) is mostly used to directly sense the rotor angle of the three-phase alternating current motor, thereby performing feedback control on a rotation speed using the obtained rotor angle. However, in the foregoing conventional method, entire costs of the three-phase alternating current motor (or a motor control configured to control the three-phase alternating current motor) are increased because a rotor angle sensor (such as an encoder, a rotating transformer, or a Hall sensor) is required to be disposed.

Therefore, there are other conventional methods in which a real rotor angle of the three-phase alternating current motor is estimated without using the rotor angle sensor. Known estimation algorithms include sliding mode control, high frequency injection, low frequency injection, and observation of back electromotive force. However, in the foregoing methods, a complex arithmetic unit is required to be disposed, and the arithmetic unit is required to be designed for specification parameters related to the three-phase alternating current motor and the algorithms. In other words, in the current known estimation algorithms, costs still cannot be effectively reduced, and an application range is narrowed as a result of an additional customized design required for a respective three-phase alternating current motor.

On this basis, those skilled in the art are committed to calculating a real rotor angle of a three-phase alternating current motor of any specification without using a rotor angle sensor in a relatively advanced and extensible estimation manner.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a motor controller and a motor control method, so that a rotor angle of a three-phase alternating current motor may be directly calculated using three phase current values of the three-phase alternating current motor.

An embodiment of the invention provides a motor controller adapted to control the three-phase alternating current motor. The three-phase alternating current motor has no rotor angle sensor that is configured to sense a real rotor angle of the three-phase alternating current motor. The motor controller includes: a rotation speed controller, a pulse width modulation (PWM) circuit unit, an inverter, a current sensing circuit, and a rotor angle calculation circuit. The pulse width modulation (PWM) circuit unit is configured to receive a plurality of voltage control signals from the rotation speed controller of the three-phase alternating current motor, to output a plurality of PWM signals. The inverter is configured to receive the plurality of PWM signals to output three phase currents to three stator windings of the three-phase alternating current motor, so that the three-phase alternating current motor rotates. The current sensing circuit is electrically connected to the inverter, and the current sensing circuit is configured to sense three phase current values of the three phase currents outputted to the three stator windings. A phase difference of 120 degrees is provided among the three phase currents from each other, and the three phase current values include a U-phase current value, a V-phase current value, and a W-phase current value. The rotor angle calculation circuit is configured to directly calculate the real rotor angle of the three-phase alternating current motor according to two of the three phase current values. In addition, the rotation speed controller is configured to adjust the plurality of the outputted voltage control signals according to the expected rotor speed and the calculated real rotor angle, so as to make the real rotor speed of the three-phase alternating current motor reach the expected rotor speed.

An embodiment of the invention provides a motor control method adapted to control the three-phase alternating current motor. The three-phase alternating current motor has no rotor angle sensor that is configured to sense a real rotor angle of the three-phase alternating current motor. The method includes the following steps. A plurality of voltage control signals are received from a rotation speed controller of the three-phase alternating current motor through a pulse width modulation (PWM) circuit unit of the three-phase alternating current motor to output a plurality of PWM signals. The plurality of PWM signals are received through an inverter of the three-phase alternating current motor to output three phase currents to three stator windings of the three-phase alternating current motor, so that the three-phase alternating current motor rotates. Through a current sensing circuit of the three-phase alternating current motor, three phase current values of the three phase currents outputted to the three stator windings are sensed, where a phase difference of 120 degrees is provided among the three phase currents from each other, the three phase current values include a U-phase current value, a V-phase current value, and a W-phase current value. The current sensing circuit is electrically connected to the inverter. The real rotor angle of the three-phase alternating current motor is directly calculated through a rotor angle calculation circuit of the three-phase alternating current motor according to two of the three phase current values. Through the rotation speed controller of the three-phase alternating current motor, the plurality of the outputted voltage control signals are adjusted according to the expected rotor speed and the calculated real rotor angle, so as to make the real rotor speed of the three-phase alternating current motor reach the expected rotor speed.

Based on the foregoing, according to the motor controller and the motor control method in the embodiments of the invention, the three phase current values of the three-phase alternating current motor may be directly used to calculate the real rotor angle of the three-phase alternating current motor without utilizing a rotor angle sensor, so as to adjust the plurality of outputted voltage control signals according to the expected rotor speed and the calculated real rotor angle, thereby making the real rotor speed of the three-phase alternating current motor reach the expected rotor speed. In this way, not only hardware costs of the rotor angle sensor are reduced, but also the real rotor speed of the three-phase alternating current motor can still be controlled effectively through the calculated real rotor angle, thereby enhancing efficiency of the three-phase alternating current motor.

In order to make the aforementioned and other objectives and advantages of the invention comprehensible, embodiments accompanied with figures are described in detail below.

DESCRIPTION OF THE EMBODIMENTS

Embodiments of the invention will be illustrated below with the accompanying drawings. The directional terms mentioned in the invention, like "above", "below", "left", "right", "front" and "back", refer to the directions in the appended drawings. Therefore, the directional terms are only used for illustration instead of limiting the invention.

Embodiment 1

Figure 1:
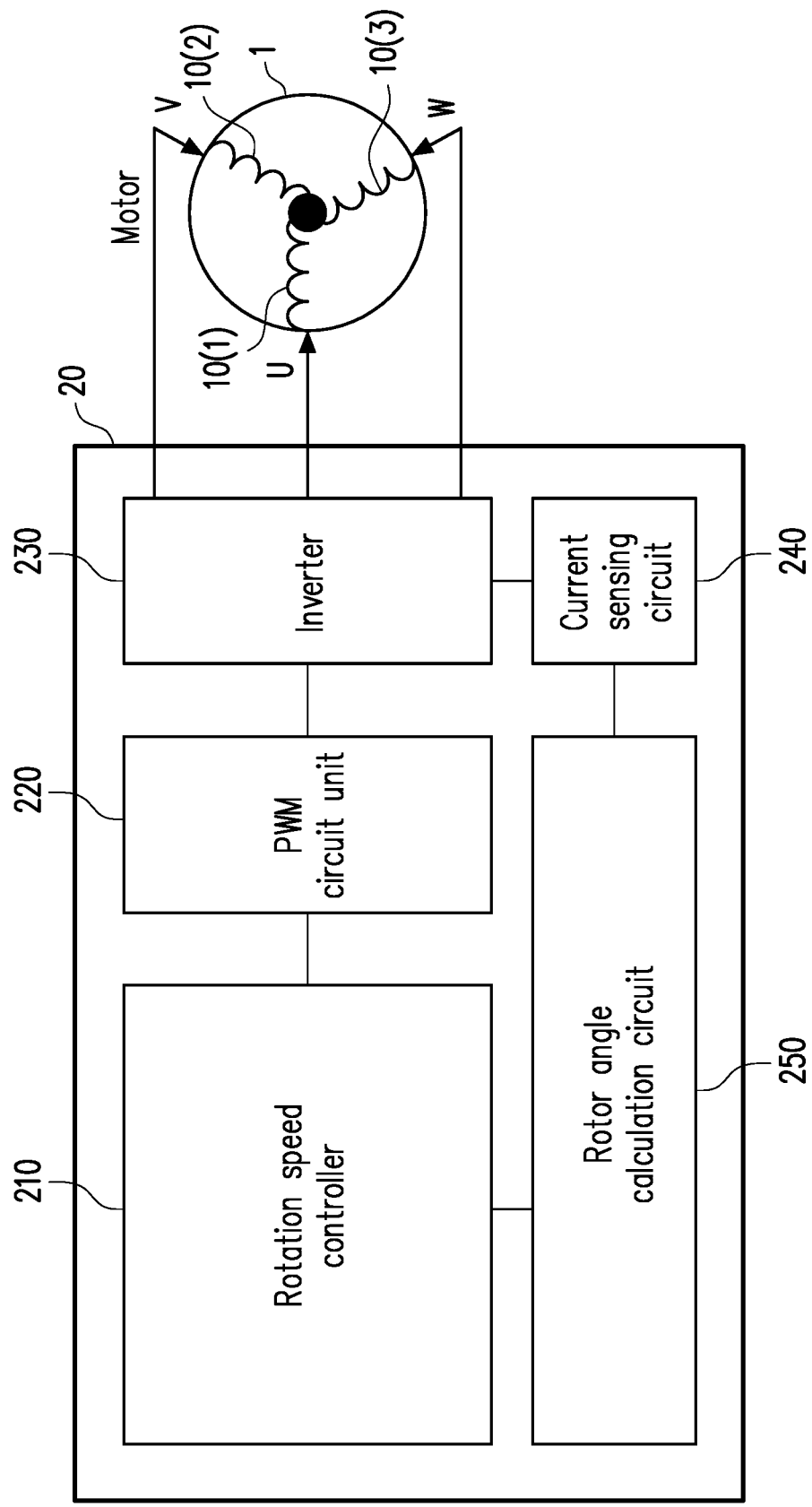
FIG. 1 is a schematic block diagram of a motor controller according to Embodiment 1 of the invention.

FIG. 1 is a schematic block diagram of a motor controller according to Embodiment 1 of the invention. Referring to FIG. 1, in the present embodiment, a motor controller 20 is electrically connected to a motor 1 and is configured to control the motor 1. The motor controller 20 includes a rotation speed controller 210, a pulse width modulation (PWM) circuit unit 220, an inverter (also referred to as a converter) 230, a current sensing circuit 240, and a rotor angle calculation circuit 250. The motor 1 includes stator windings 10(1)-10(3), the stator windings 10(1)-10(3) receiving three phase currents U, V, and W outputted by the motor controller 20 to change a magnetic field vector of the motor 1, so that a rotor of the motor 1 rotates. It should be noted that, in the present embodiment, the motor 1 is a three-phase alternating current motor, and neither of the motor 1 and the motor controller 210 has a rotor angle sensor/rotor address sensor that is configured to directly sense a rotor angle/rotor address of the motor 1. Functions and interactive operations of various elements of the motor controller 20 are described below using FIG. 2 to FIG. 4.

Figure 2:
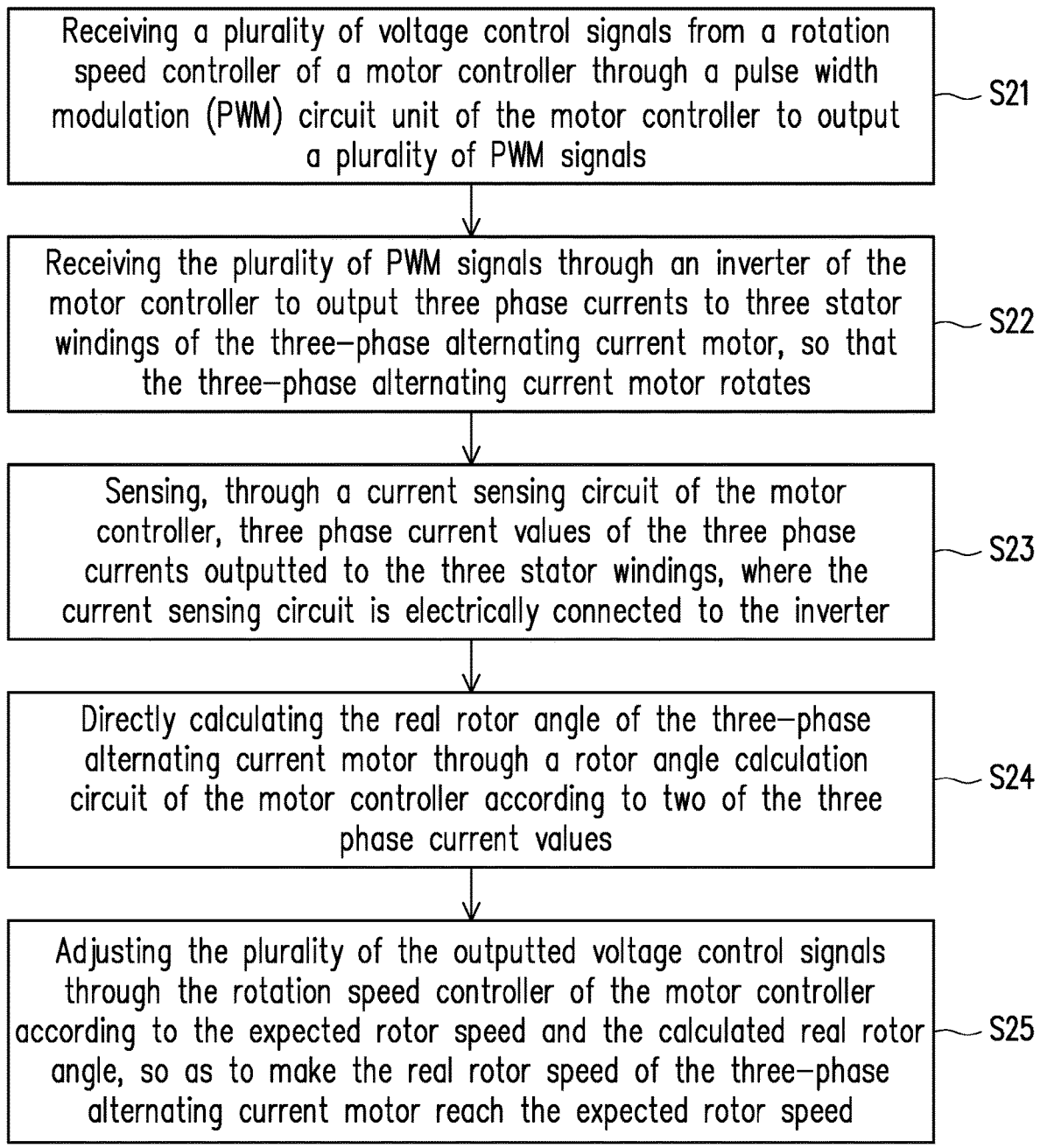
FIG. 2 is a flowchart of a motor control method according to Embodiment 1 of the invention.
Figure 3:
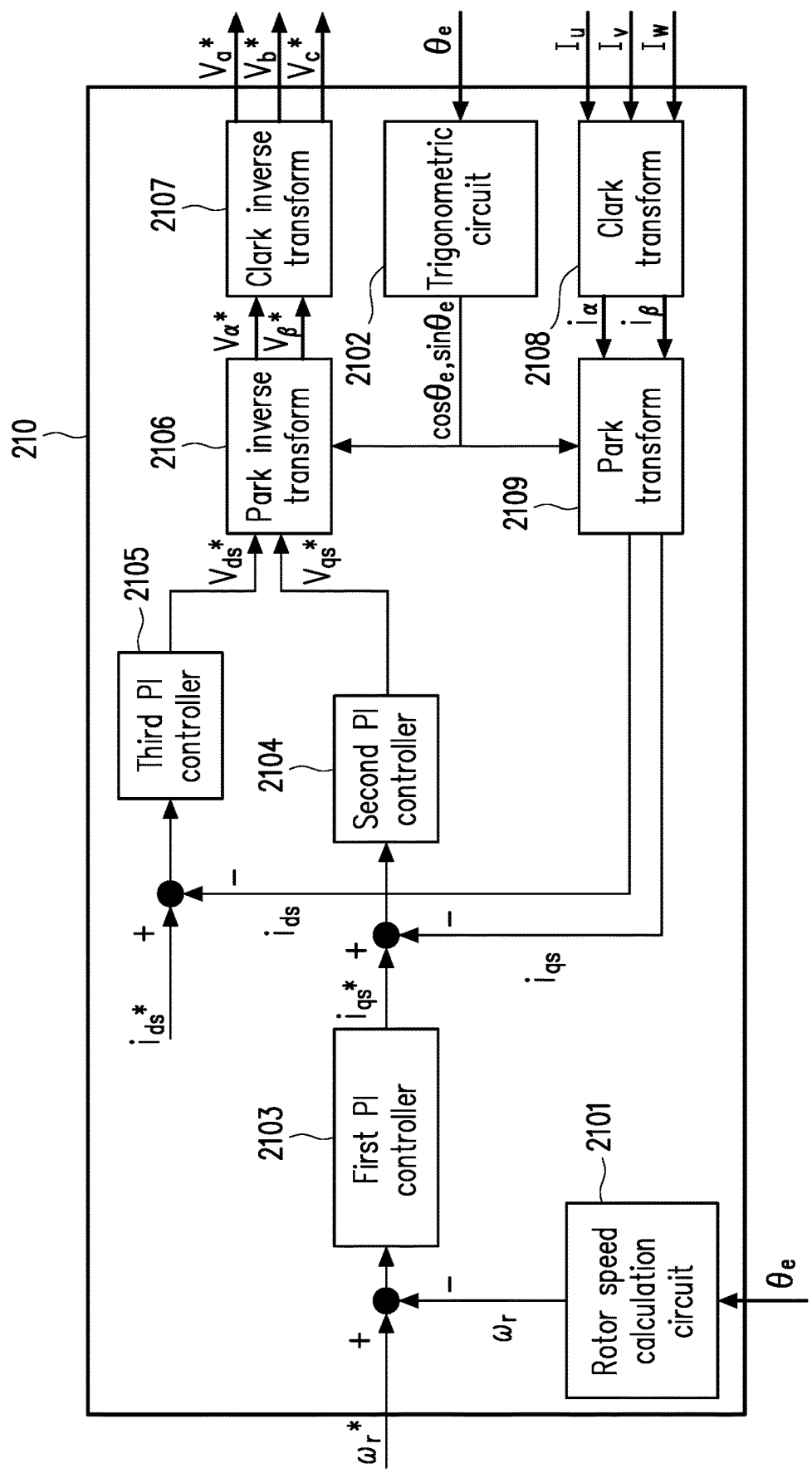
FIG. 3 is a schematic block diagram of a rotation speed controller according to Embodiment 1 of the invention.
Figure 4:
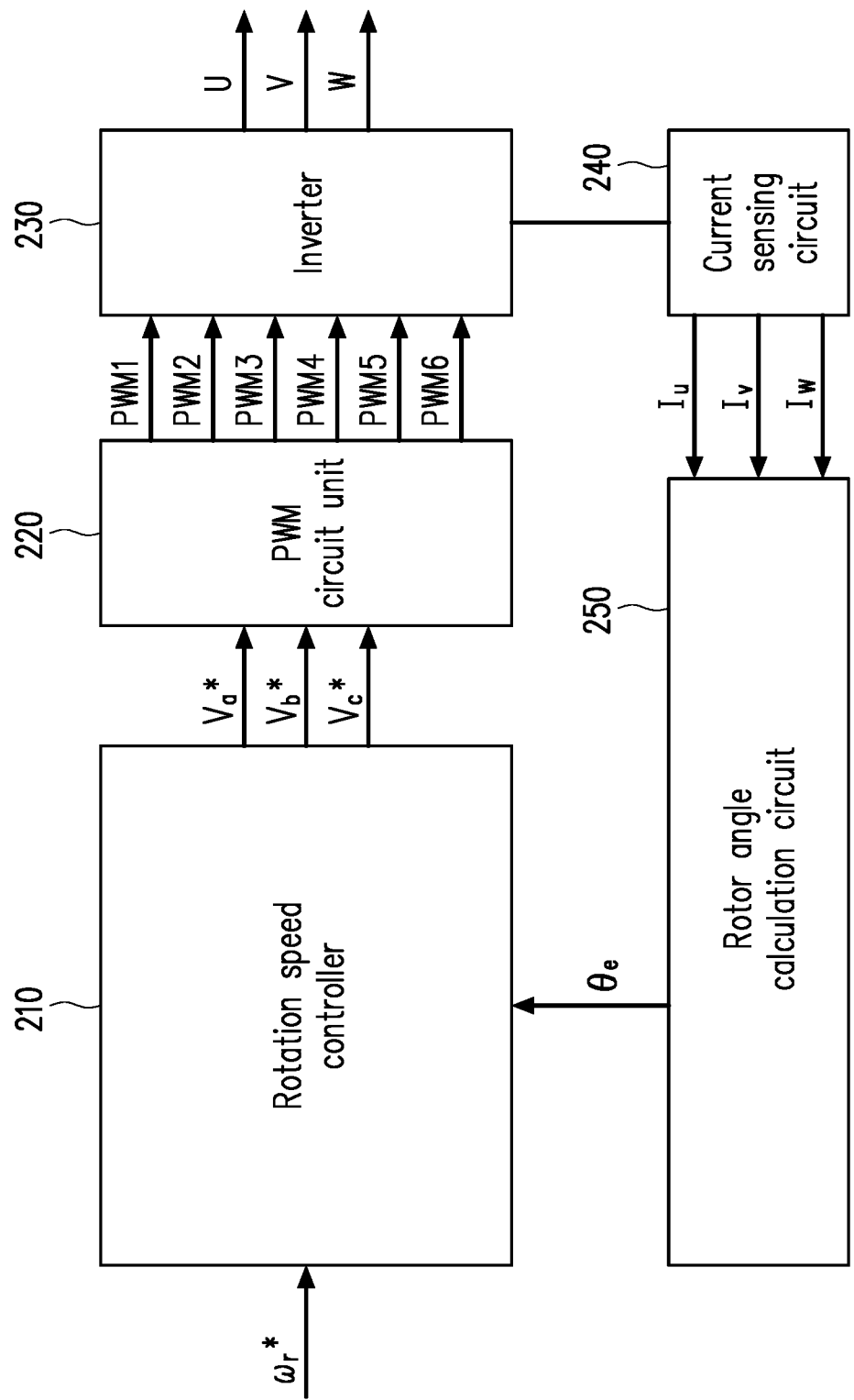
FIG. 4 is a schematic diagram of a system architecture of a motor controller according to Embodiment 1 of the invention.

FIG. 2 is a flowchart of a motor control method according to Embodiment 1 of the invention. FIG. 3 is a schematic block diagram of a rotation speed controller according to Embodiment 1 of the invention. FIG. 4 is a schematic diagram of a system architecture of a motor controller according to Embodiment 1 of the invention.

Referring to FIG. 2 and FIG. 4, in step S21, a plurality of voltage control signals $v_a^*$-$v_c^*$ are received from a rotation speed controller 210 of a motor controller through a pulse width modulation (PWM) circuit unit 220 of the motor controller, to output a plurality of PWM signals PWM1-PWM6.

In particular, the rotation speed controller 210 receives a default expected rotor speed $\omega_r^*$, the expected rotor speed $\omega_r^*$ being set based on a rotation speed instruction received by the rotation speed controller 210. Operation details of the rotation speed controller 210 are described below using FIG. 3.

Referring to FIG. 3, in the present embodiment, the rotation speed controller 210 includes a rotor speed calculation circuit 2101, a trigonometric function circuit 2102, a first proportional-integral (PI) controller 2103, a second PI controller 2104, a third PI controller 2105, a Park inverse transform unit 2106, a Clark inverse transform unit 2107, a Park transform unit 2109, and a Clark transform unit 2108.

The rotor speed calculation circuit is configured to perform a differential operation on a real rotor angle $\theta_e$ to obtain the real rotor speed $\omega_r$ of the three-phase alternating current motor.

The trigonometric function circuit 2102 is configured to calculate a sine function $\sin \theta_e$ of the real rotor angle $\theta_e$ and a cosine function $\cos \theta_e$ of the real rotor angle according to the real rotor angle $\theta_e$. The trigonometric function circuit 2102 is, for example, a programmable circuit unit that applies a CORDIC algorithm. In an embodiment, the rotation speed controller 210 may also obtain the sine function $\sin \theta_e$ and the cosine function $\cos \theta_e$ of the real rotor angle $\theta_e$ by querying a table without the disposed trigonometric function circuit 2102.

In the present embodiment, a vector of a current input to a stator winding may be defined using a coordinate system of "d, q" axes. A current component of a field flux linkage corresponds to a positive d (direct) axis (also referred to as a D axis), and a current component of a torque corresponds to a positive q (quadrature) axis (also referred to as a Q axis). The "d, q"-axis coordinates of the motor may correspond to an "a, b, c" three-phase sine wave system. Generally, current vectors of the "d, q" axes may be respectively controlled by a PI controller, that is, a PID controller without a differential (D) unit.

The Clark transform unit 2108 and the Clark inverse transform unit 2107 are calculation circuit units respectively configured to perform a Clark transform operation and a Clark inverse transform operation. The Clark transform operation is used to convert a vector corresponding to an "a, b, c" three-phase coordinate system to a vector corresponding to an "α, β" two-phase coordinate system. The Clark inverse transform operation is used to convert a vector corresponding to an "α, β" two-phase coordinate system to a vector corresponding to an "a, b, c" three-phase coordinate system.

The Park transform unit 2109 and the Park inverse transform unit 2106 are calculation circuit units respectively configured to perform a Park transform operation and a Park inverse transform operation. The Park transform operation is used to convert a vector corresponding to an "α, β" two-phase coordinate system to a vector corresponding to a "d, q" two-phase coordinate system. The Park inverse transform operation is used to convert a vector corresponding to a "d, q" two-phase coordinate system to a vector corresponding to an "α, β" two-phase coordinate system.

The foregoing Clark transform operation, Clark inverse transform operation, Park transform operation, and Park inverse transform operation are technical means frequently used by those skilled in the art, and the descriptions thereof are omitted herein.

The first proportional-integral (PI) controller 2103 is configured to output a Q-axis current control signal $i_{qs}^*$ according to the input expected rotor speed $\omega_r^*$ and the calculated rotor speed $\omega_r$. The second PI controller 2104 is configured to calculate a Q-axis voltage control signal $v_{qs}^*$ according to a Q-axis current control signal $i_{qs}^*$ and a Q-axis current feedback signal $i_{qs}$. The third PI controller 2105 is configured to calculate a D-axis voltage control signal $v_{ds}^*$ according to a default D-axis current control signal $i_{ds}^*$ and a D-axis current feedback signal $i_{ds}$. A manufacturer may set a default D-axis current control signal $i_{ds}^*$ as needed.

The rotation speed controller 210 (the Park inverse transform unit 2106) performs a Park inverse transform operation according to the sine function singe and the cosine function cos $\theta_e$ of the real rotor angle, the Q-axis voltage control signal $v_{qs}^*$, and the D-axis voltage control signal $v_{ds}^*$ to obtain a first voltage control signal $v_\alpha^*$ and a second voltage control signal $v_\beta^*$.

The rotation speed controller 210 (the Clark inverse transform unit 2107) performs a Clark inverse transform operation according to the first voltage control signal $v_\alpha^*$ and the second voltage control signal $v_\beta^*$ to obtain a third voltage control signal $v_a^*$, a fourth voltage control signal $v_b^*$ and a fifth voltage control signal $v_c^*$. The third voltage control signal $v_a^*$, the fourth voltage control signal $v_b^*$, and the fifth voltage control signal $v_c^*$ are transmitted to the PWM circuit unit 220.

The rotation speed controller (the Clark transform unit 2108) performs a Clark transform operation based on three phase current values $I_u$, $I_v$, and $I_w$ to obtain a first current feedback signal $i_\alpha$ and a second current feedback signal $i_\alpha$.

The rotation speed controller (the Park transform unit 2109) performs a Park transform operation according to the first current feedback signal $i_\alpha$ and the second current feedback signal $i_\beta$ to obtain the D-axis current feedback signal $i_{ds}$ and the Q-axis current feedback signal $i_{qs}$.

Referring back to FIG. 2, in step S22, the plurality of PWM signals PWM1-PWM6 are received through an inverter 230 of the motor controller 20 to output three phase currents U, V, and W to three stator windings 10(1)-10(3) of the three-phase alternating current motor, so that the three-phase alternating current motor 1 rotates.

In step S23, the three phase current values $I_u$, $I_v$, and $I_w$ of the three phase currents U, V, and W outputted to the three stator windings 10(1)-10(3) are sensed through a current sensing circuit 240 of the motor controller 20. The current sensing circuit 240 is electrically connected to the inverter 230. The current sensing circuit 240 is, for example, a circuit unit including a single-resistor current feedback circuit, a dual-resistor current feedback circuit, or a three-resistor current feedback circuit.

It is worth mentioning that specific circuit architectures of the pulse width modulation (PWM) circuit unit 220, the inverter 230, and the current sensing circuit 240 are not a key point of the invention, and are also technical means frequently used by those skilled in the art. Therefore, the descriptions thereof are omitted herein.

In step S24, the real rotor angle $\theta_e$ of the three-phase alternating current motor 1 is directly calculated through a rotor angle calculation circuit 250 of the motor controller 20 according to two of the three phase current values $I_u$, $I_v$, and $I_w$.

In particular, in the present embodiment, the rotor angle calculation circuit 250 is, for example, an application-specific integrated circuit, a programmable processor, or a microprocessor for implementing a rotor angle calculation algorithm. The rotor angle calculation algorithm in Embodiment 1 defines relationships between the three phase current values $I_u$, $I_v$, and $I_w$ and the real rotor angle $\theta_e$ through the following formulas (1-1), (1-2), and (1-3):

$$I_u = \sin\theta_e, \qquad (1\text{-}1)$$

$$I_v = \sin(\theta_e - 120) = \qquad (1\text{-}2)$$
$$\sin\theta_e \cos 120 - \cos\theta_e \sin 120 = -\frac{1}{2}\sin\theta_e - \frac{\sqrt{3}}{2}\cos\theta_e, \text{ and}$$

$$I_w = \sin(\theta_e - 240) = \qquad (1\text{-}3)$$
$$\sin\theta_e \cos 240 - \cos\theta_e \sin 240 = -\frac{1}{2}\sin\theta_e + \frac{\sqrt{3}}{2}\cos\theta_e.$$

$\theta_e$ is the real rotor angle with a unit of degree; $I_u$ is the U-phase current value, $I_v$ is the V-phase current value, and $I_w$ is the W-phase current value with a unit of ampere (A).

Figure 5:
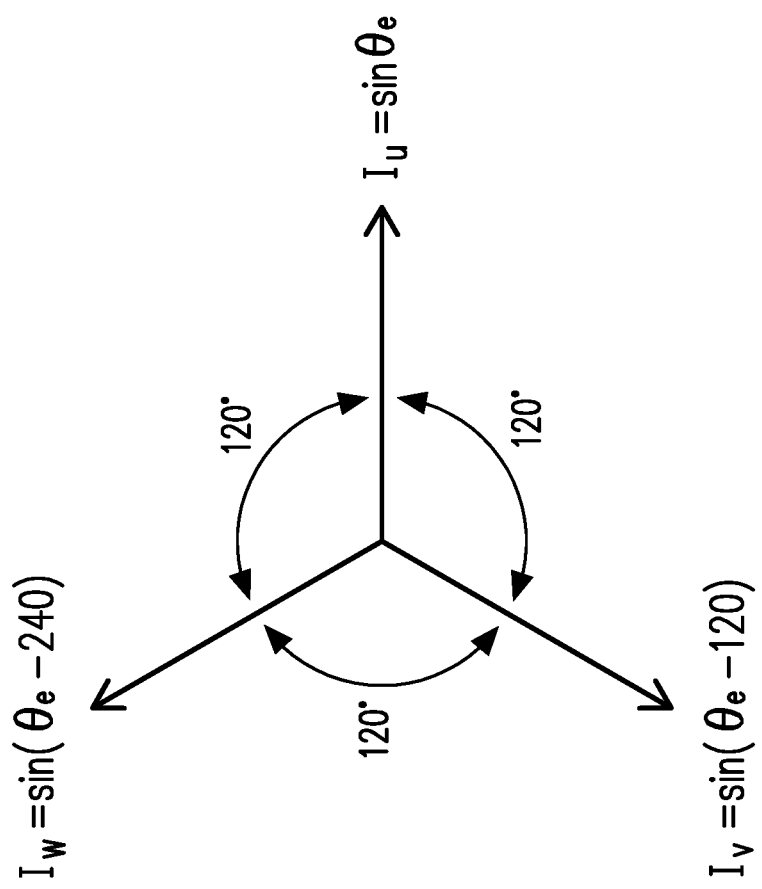
FIG. 5 is a schematic diagram of vectors of three phase currents according to Embodiment 1 of the invention.

FIG. 5 is a schematic diagram of vectors of three phase currents according to Embodiment 1 of the invention. Referring to FIG. 5, assuming that the U-phase current is shown as sin $\theta_e$, the V-phase current is lower than the U-phase current by 120 degrees, and the W-phase current is lower than the U-phase current by 240 degrees.

Next, with the relationships defined above, a formula for calculating the real rotor angle $\theta_e$ may be derived using two of the three phase current values $I_u$, $I_v$, and $I_w$. It should be noted that a detailed derivation process is not a key point of the invention, and therefore the descriptions thereof are omitted herein.

For example, the rotor angle calculation circuit 250 may directly calculate the real rotor angle $\theta_e$ according to the U-phase current value $I_u$ and the V-phase current value $I_v$ through the following formula (1-4):

$$\theta_e = \tan^{-1}\left(-\sqrt{3}\left(\frac{I_u}{2I_v + I_u}\right)\right). \qquad (1\text{-}4)$$

Figure 6A:
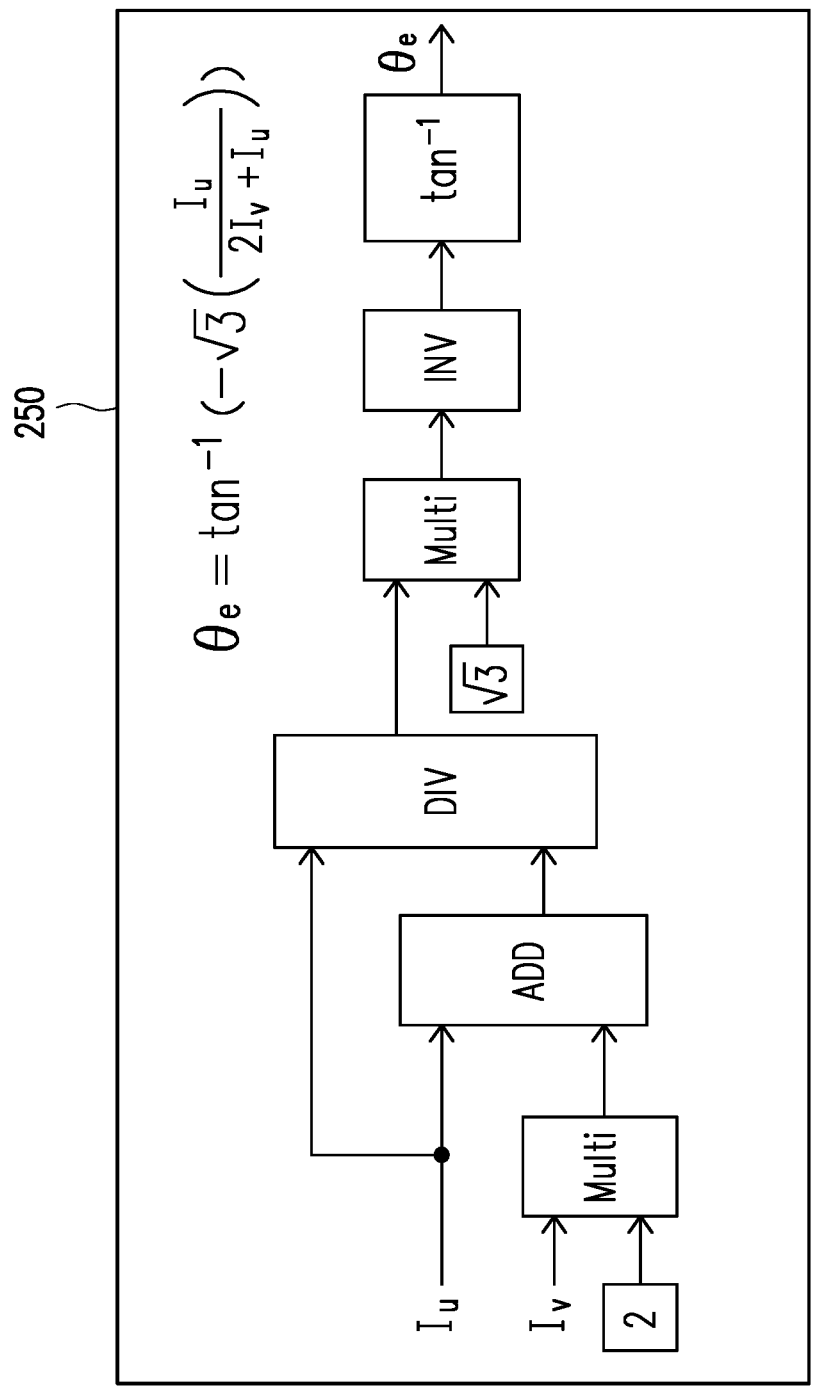
FIG. 6A to FIG. 6C are schematic block diagrams of a rotor angle calculation circuit according to Embodiment 1 of the invention.
Figure 6B:
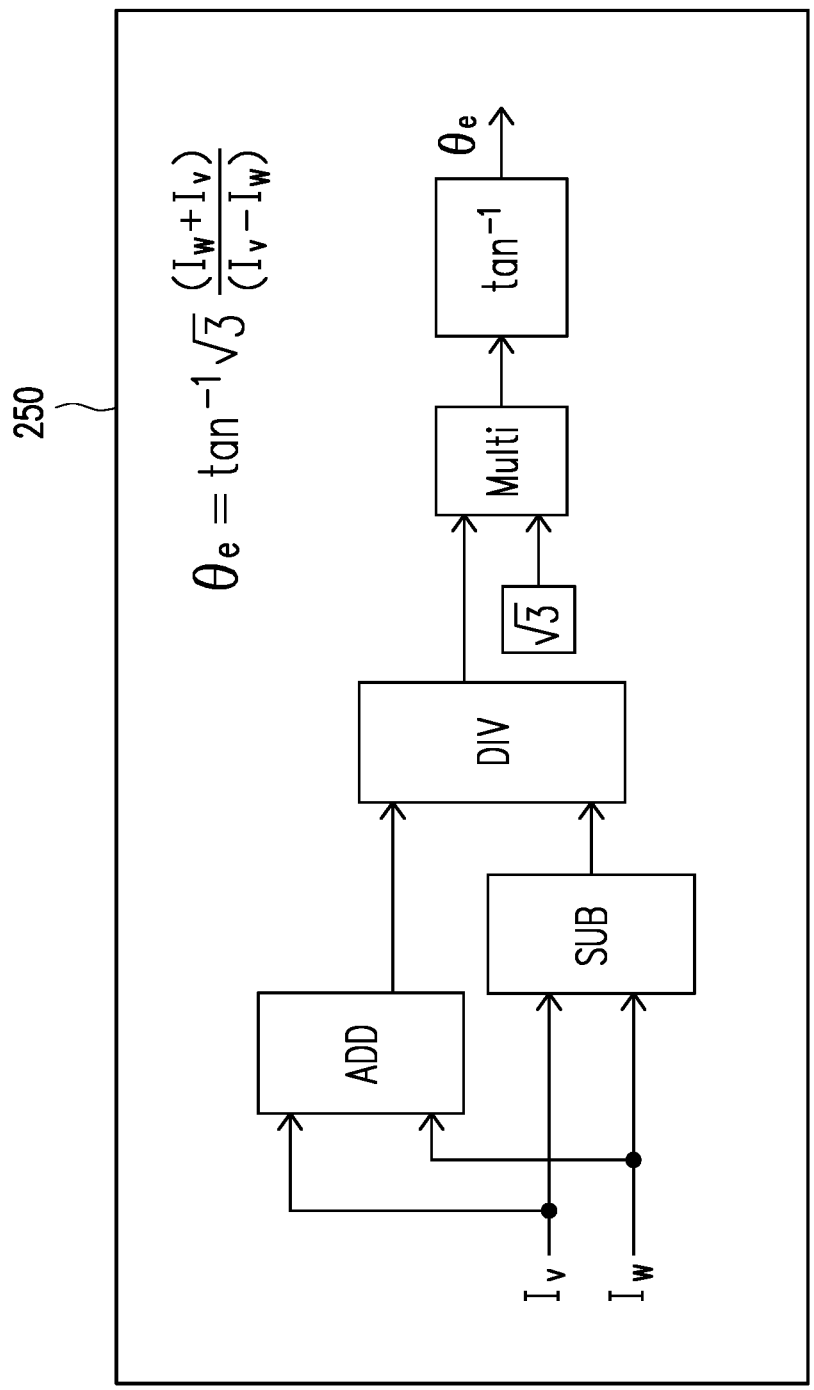
Figure 6C:
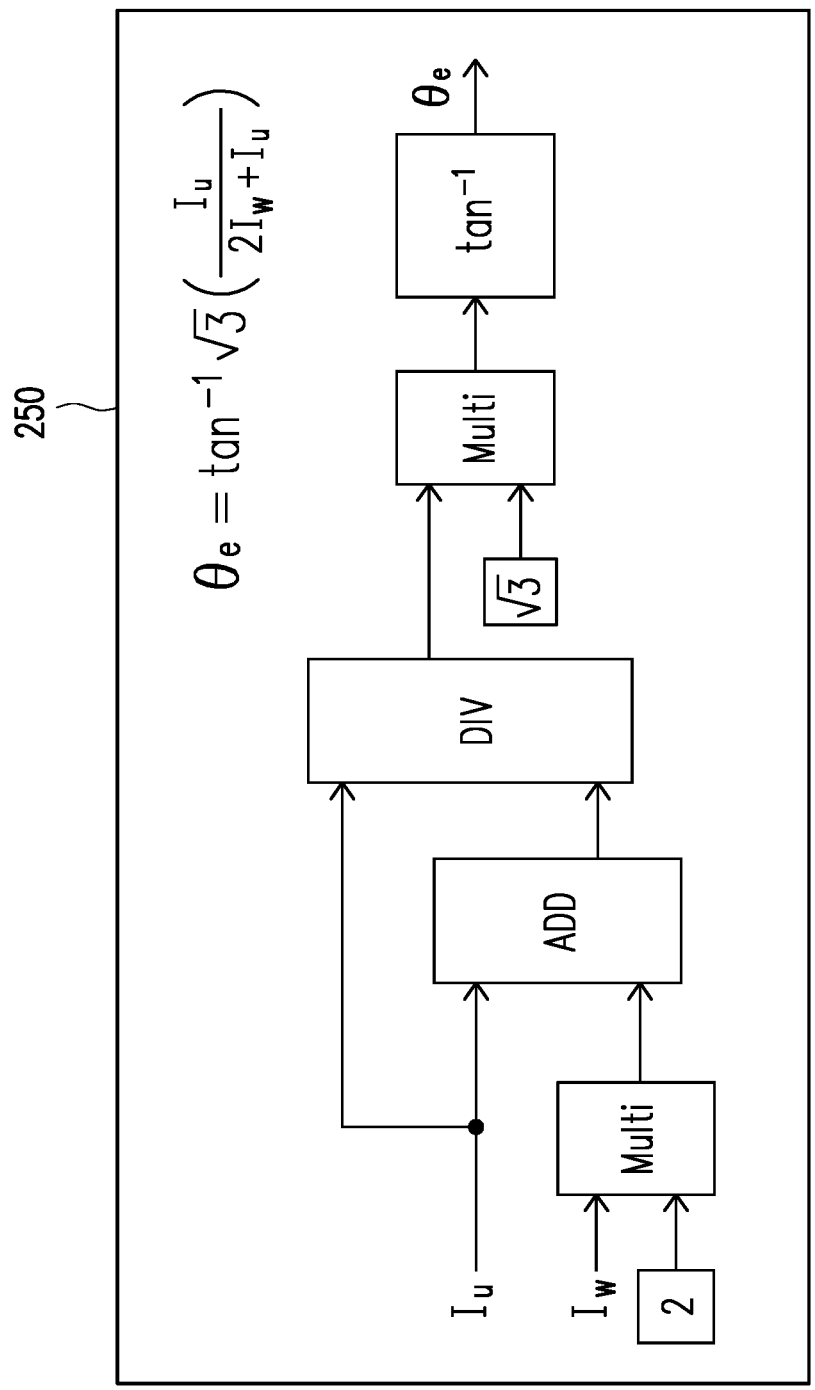

FIG. 6A to FIG. 6C are a schematic block diagrams of a rotor angle calculation circuit according to Embodiment 1 of the invention. Referring to FIG. 6A, the rotor angle calculation circuit 250 may be implemented using a multiplication unit (Multi), an addition (ADD) unit, a division (DIV) unit, an inversion (INV) unit, and an arc tangent (arctan) unit according to the foregoing formula (1-4). In particular, $2I_v+I_u$ is obtained after the V-phase current value $I_v$ is multiplied by 2 and then plus the U-phase current value $I_u$;

$$\left(\frac{I_u}{2I_v + I_u}\right)$$

is obtained after $2I_v+I_u$ is divided by the U-phase current value $I_u$;

$$\sqrt{3}\left(\frac{I_u}{2I_v + I_u}\right)$$

is obtained after $$\left(\frac{I_u}{2I_v + I_u}\right)$$

is multiplied by $\sqrt{3}$;

$$-\sqrt{3}\left(\frac{I_u}{2I_v + I_u}\right)$$

is obtained after inversion of $$\sqrt{3}\left(\frac{I_u}{2I_v + I_u}\right);$$

and the real rotor angle $\theta_e$ is obtained after arc tangent of $$-\sqrt{3}\left(\frac{I_u}{2I_v + I_u}\right).$$

For another example, the rotor angle calculation circuit 250 may directly calculate the real rotor angle $\theta_e$ according to the V-phase current value $I_V$ and the W-phase current value $I_w$ through the following formula (1-5):

$$\theta_e = \tan^{-1}\sqrt{3}\frac{(I_w + I_v)}{(I_v - I_w)}. \qquad (1\text{-}5)$$

Referring to FIG. 6B, the rotor angle calculation circuit 250 may be implemented using a multiplication (Multi) unit, an addition (ADD) unit, a subtraction (SUB) unit, a division (DIV) unit, and an arc tangent (arctan) unit according to the foregoing formula (1-5).

For another example, the rotor angle calculation circuit 250 may directly calculate the real rotor angle $\theta_e$ according to the U-phase current value $I_u$ and the W-phase current value $I_w$ through the following formula (1-6):

$$\theta_e = \tan^{-1}\sqrt{3}\left(\frac{I_u}{2I_w + I_u}\right). \qquad (1\text{-}6)$$

Referring to FIG. 6C, the rotor angle calculation circuit 250 may be implemented using a multiplication (Multi) unit, an addition (ADD) unit, a division (DIV) unit, and an arc tangent (arctan) unit through the foregoing formula (1-6).

Referring back to FIG. 2, after the real rotor angle is obtained, in step S25, the plurality of outputted voltage control signals $v_a^*$-$v_c^*$ are adjusted through the rotation speed controller 210 of the motor controller 20 according the expected rotor speed $\omega_r^*$ and the calculated real rotor speed $\theta_e$, so as to make the real rotor speed $\omega_r$ of the three-phase alternating current motor reach the expected rotor speed $\omega_r^*$.

In particular, during obtaining of the real rotor angle $\theta_e$, the rotor speed calculation circuit 2101 may perform, based on a plurality of real rotor angles $\theta_e$ continuously obtained in a time sequence, a differential operation to obtain the real rotor speed $\omega_r$. In this way, the real rotor speed $\omega_r$ is regarded as a feedback rotor speed, so that the rotation speed controller 210 adjusts the plurality of outputted voltage control signals $v_a^*$-$v_c^*$, thereby making the real rotor speed $\omega_r$ gradually approach the expected rotor speed $\omega_r^*$.

Embodiment 2

A difference between Embodiment 2 and Embodiment 1 lies in an implementation of the rotor angle calculation circuit 250. Other hardware elements are the same as those of Embodiment 1, and therefore the descriptions thereof are omitted herein.

In particular, the rotor angle calculation algorithm implemented on the rotor angle calculation circuit 250 in Embodiment 2 defines relationships between three phase current values $I_u$, $I_v$, and $I_w$ and the real rotor angle $\theta_e$ through the following formulas (2-1), (2-2), and (2-3):

$$I_u = \sin\theta_e, \qquad (2\text{-}1)$$

$$I_v = \sin(\theta_e + 120) = \qquad (2\text{-}2)$$

$$\sin\theta_e\cos 120 + \cos\theta_e\sin 120 = -\frac{1}{2}\sin\theta_e + \frac{\sqrt{3}}{2}\cos\theta_e, \text{ and}$$

$$I_w = \sin(\theta_e + 240) = \qquad (2\text{-}3)$$

$$\sin\theta_e\cos 240 + \cos\theta_e\sin 240 = -\frac{1}{2}\sin\theta_e - \frac{\sqrt{3}}{2}\cos\theta_e.$$

$\theta_e$ is the real rotor angle with a unit of degree; $I_u$ is the U-phase current value, $I_v$ is the V-phase current value, and $I_w$ is the W-phase current value with a unit of ampere (A).

Similarly, with the relationships defined above, a formula for calculating the real rotor angle $\theta_e$ may be derived using two of the three phase current values $I_u$, $I_v$, and $I_w$.

For example, the rotor angle calculation circuit 250 may directly calculate the real rotor angle $\theta_e$ according to the U-phase current value $I_u$ and the V-phase current value $I_v$ through the following formula (2-4):

$$\theta_e = \tan^{-1}\sqrt{3}\left(\frac{I_u}{2I_v + I_u}\right). \qquad (2\text{-}4)$$

Figure 7A:
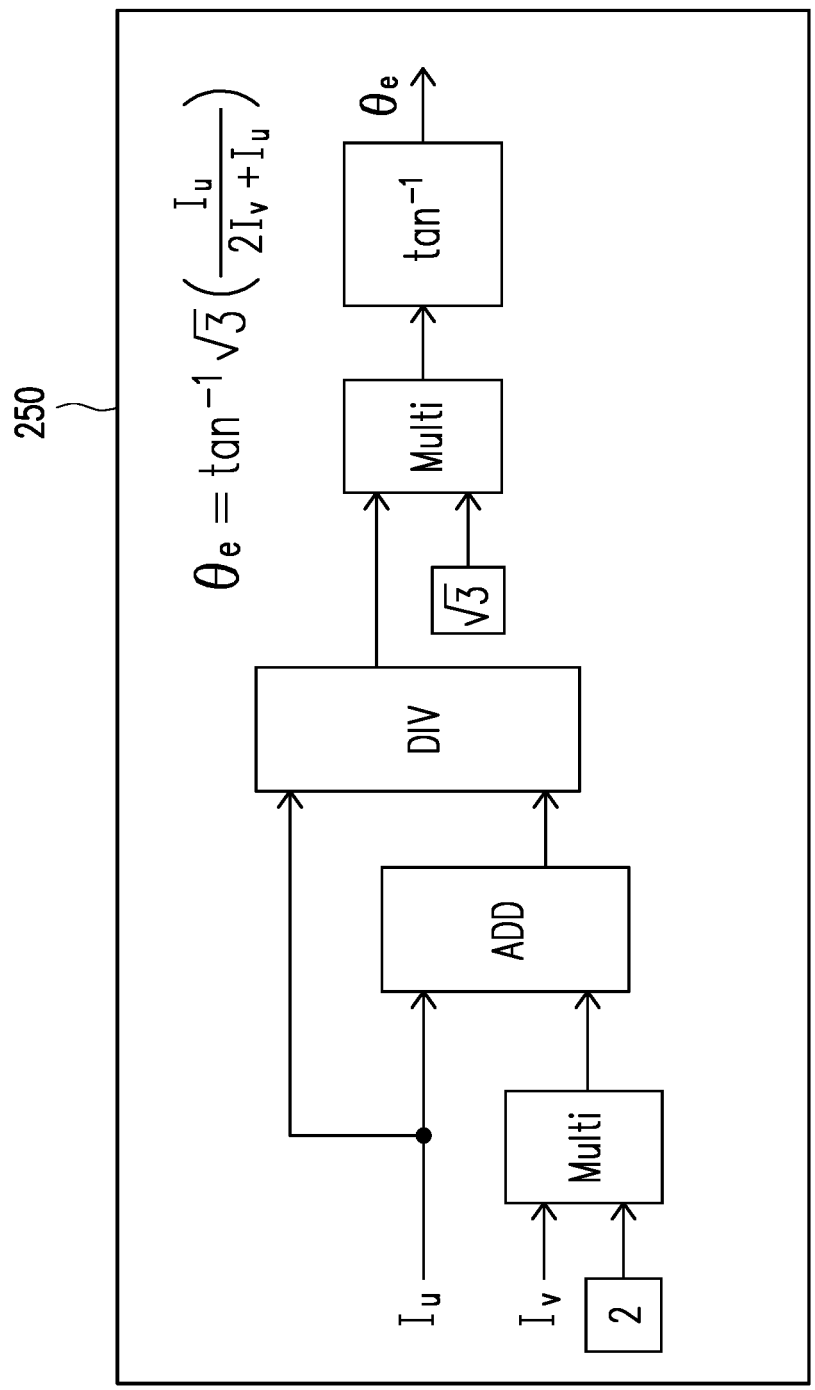
FIG. 7A to FIG. 7C are schematic block diagrams of a rotor angle calculation circuit according to Embodiment 2 of the invention.
Figure 7B:
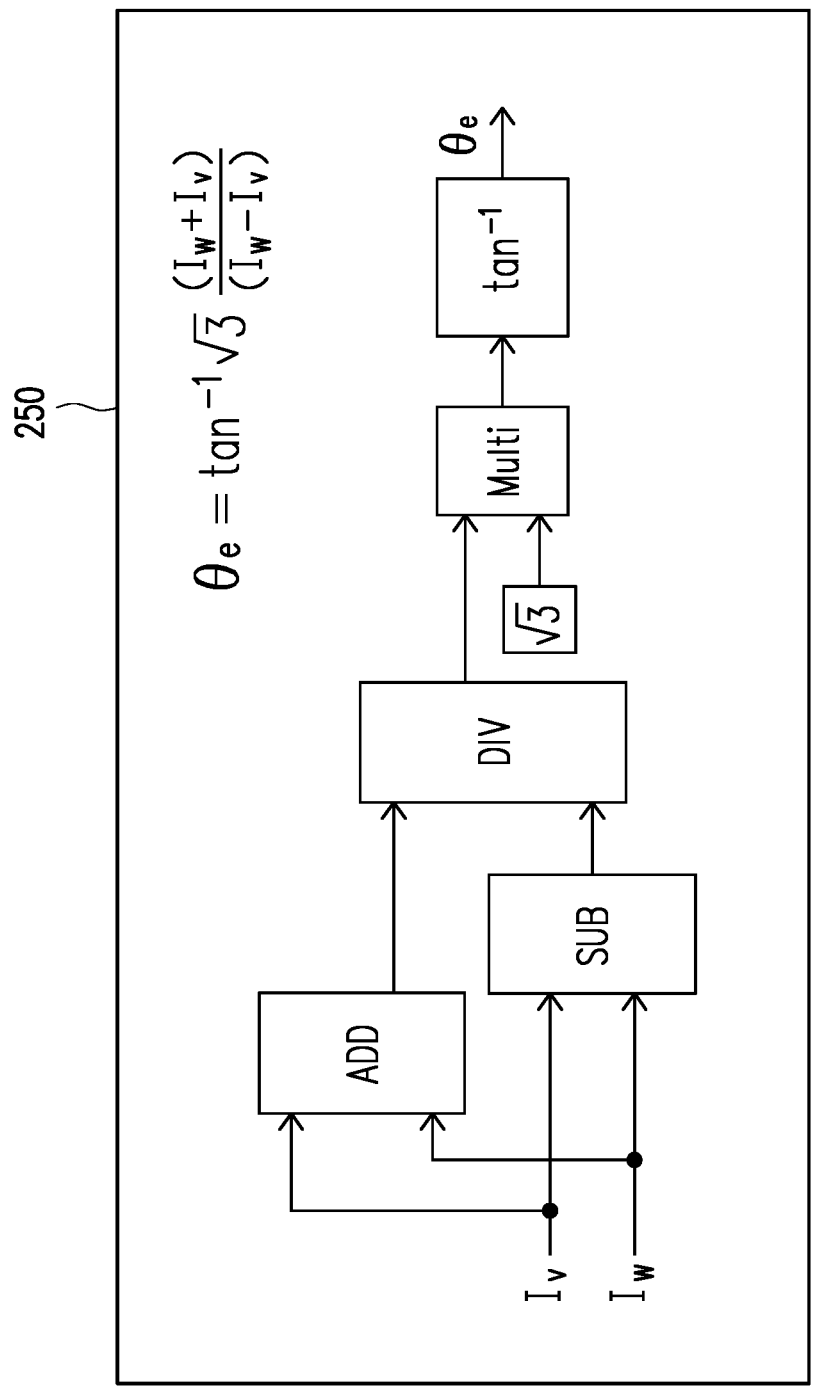
Figure 7C:
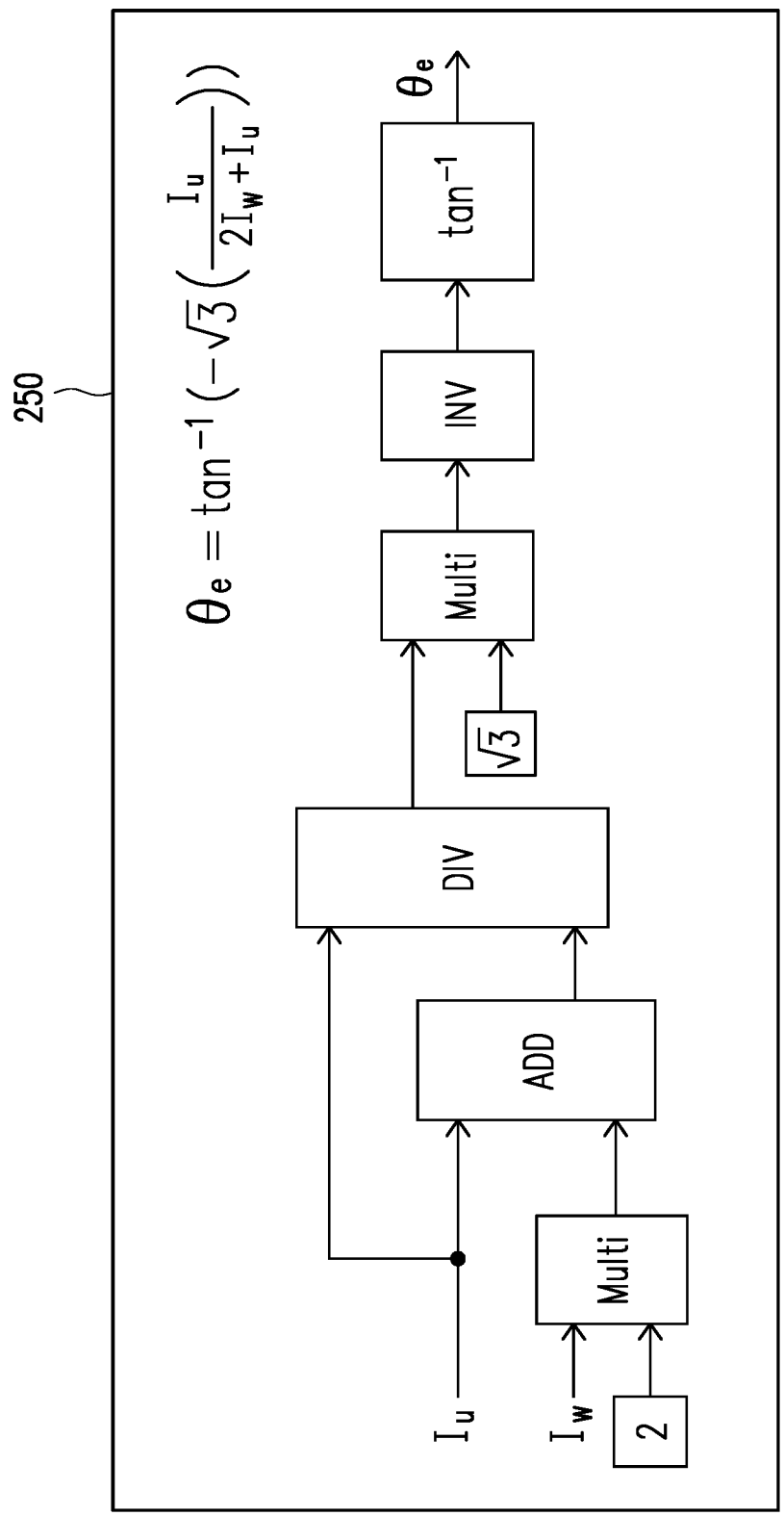

FIG. 7A to FIG. 7C are schematic block diagrams of a rotor angle calculation circuit according to Embodiment 2 of the invention. Referring to FIG. 7A, the rotor angle calculation circuit 250 may be implemented using a multiplication (Multi) unit, an addition (ADD) unit, a division (DIV) unit, and an arctangent (arctan, tan$^{-1}$) unit according to the foregoing formula (2-4).

For another example, the rotor angle calculation circuit 250 may directly calculate the real rotor angle $\theta_e$ according to the V-phase current value $I_V$ and the W-phase current value $I_w$ through the following formula (2-5):

$$\theta_e = \tan^{-1} \sqrt{3} \frac{(I_w + I_v)}{(I_w - I_v)}. \quad (2\text{-}5)$$

Referring to FIG. 7B, the rotor angle calculation circuit 250 may be implemented using a multiplication (Multi) unit, an addition (ADD) unit, a subtraction (SUB) unit, a division (DIV) unit, and an arc tangent (arctan, tan$^{-1}$) unit according to the foregoing formula (2-5).

For another example, the rotor angle calculation circuit 250 may directly calculate the real rotor angle $\theta_e$ according to the U-phase current value $I_u$ and the W-phase current value $I_w$ through the following formula (2-6):

$$\theta_e = \tan^{-1}\left(-\sqrt{3}\left(\frac{I_u}{2I_w + I_u}\right)\right). \quad (2\text{-}6)$$

Referring to FIG. 7C, the rotor angle calculation circuit 250 may be implemented using a multiplication (Multi) unit, an addition (ADD) unit, a division (DIV) unit, an inversion (INV) unit, and an arc tangent (arctan, tan$^{-1}$) unit according to the foregoing formula (2-6).

Embodiment 3

A difference between Embodiment 3 and Embodiment 1 lies in an implementation of the rotor angle calculation circuit 250. Other hardware elements are the same as those of Embodiment 1, and therefore the descriptions thereof are omitted herein.

In particular, the rotor angle calculation algorithm implemented on the rotor angle calculation circuit 250 in Embodiment 3 defines relationships between the three phase current values $I_u$, $I_v$, and $I_w$ and the real rotor angle $\theta_e$ through the following formulas (3-1), (3-2), (3-3):

$$I_u = \cos\theta_e, \quad (3\text{-}1)$$

$$I_v = \cos(\theta_e - 120) =$$
$$\cos\theta_e \cos 120 + \sin\theta_e \sin 120 = -\frac{1}{2}\cos\theta_e + \frac{\sqrt{3}}{2}\sin\theta_e, \text{ and} \quad (3\text{-}2)$$

$$I_w = \cos(\theta_e - 240) =$$
$$\cos\theta_e \cos 240 + \sin\theta_e \sin 240 = -\frac{1}{2}\cos\theta_e - \frac{\sqrt{3}}{2}\sin\theta_e. \quad (3\text{-}3)$$

$\theta_e$ is the real rotor angle with a unit of degree; $I_u$ is the U-phase current value, $I_v$ is the V-phase current value, and $I_w$ is the W-phase current value with a unit of ampere (A).

Similarly, with the relationships defined above, a formula for calculating the real rotor angle $\theta_e$ may be derived using two of the three phase current values $I_u$, $I_v$, and $I_w$.

For example, the rotor angle calculation circuit 250 may directly calculate the real rotor angle $\theta_e$ according to the U-phase current value $I_u$ and the V-phase current value $I_v$ through the following formula (3-4):

$$\theta_e = \tan^{-1} \frac{1}{\sqrt{3}}\left(\frac{2I_v + I_u}{I_u}\right). \quad (3\text{-}4)$$

Figure 8A:
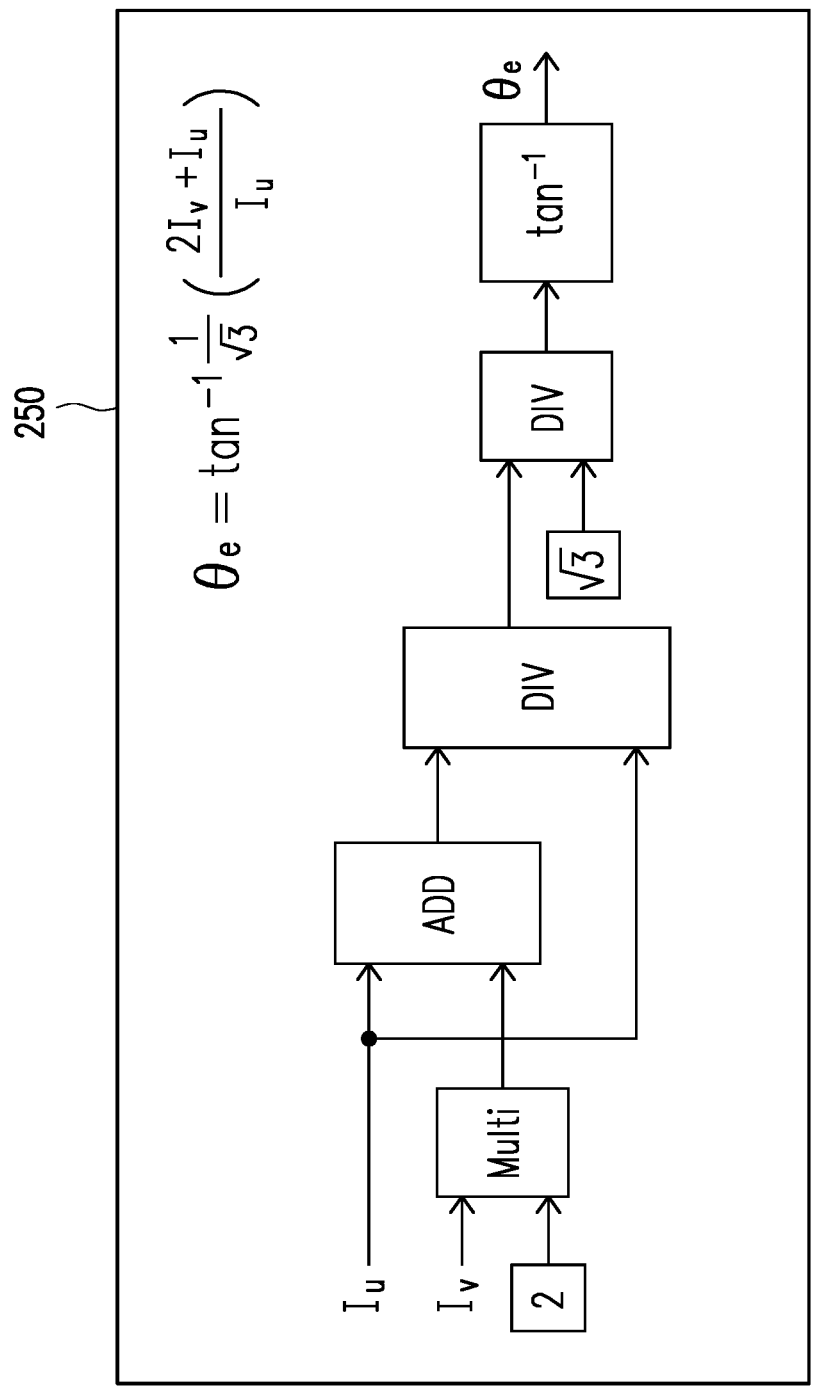
FIG. 8A to FIG. 8C are schematic block diagrams of a rotor angle calculation circuit according to Embodiment 3 of the invention.
Figure 8B:
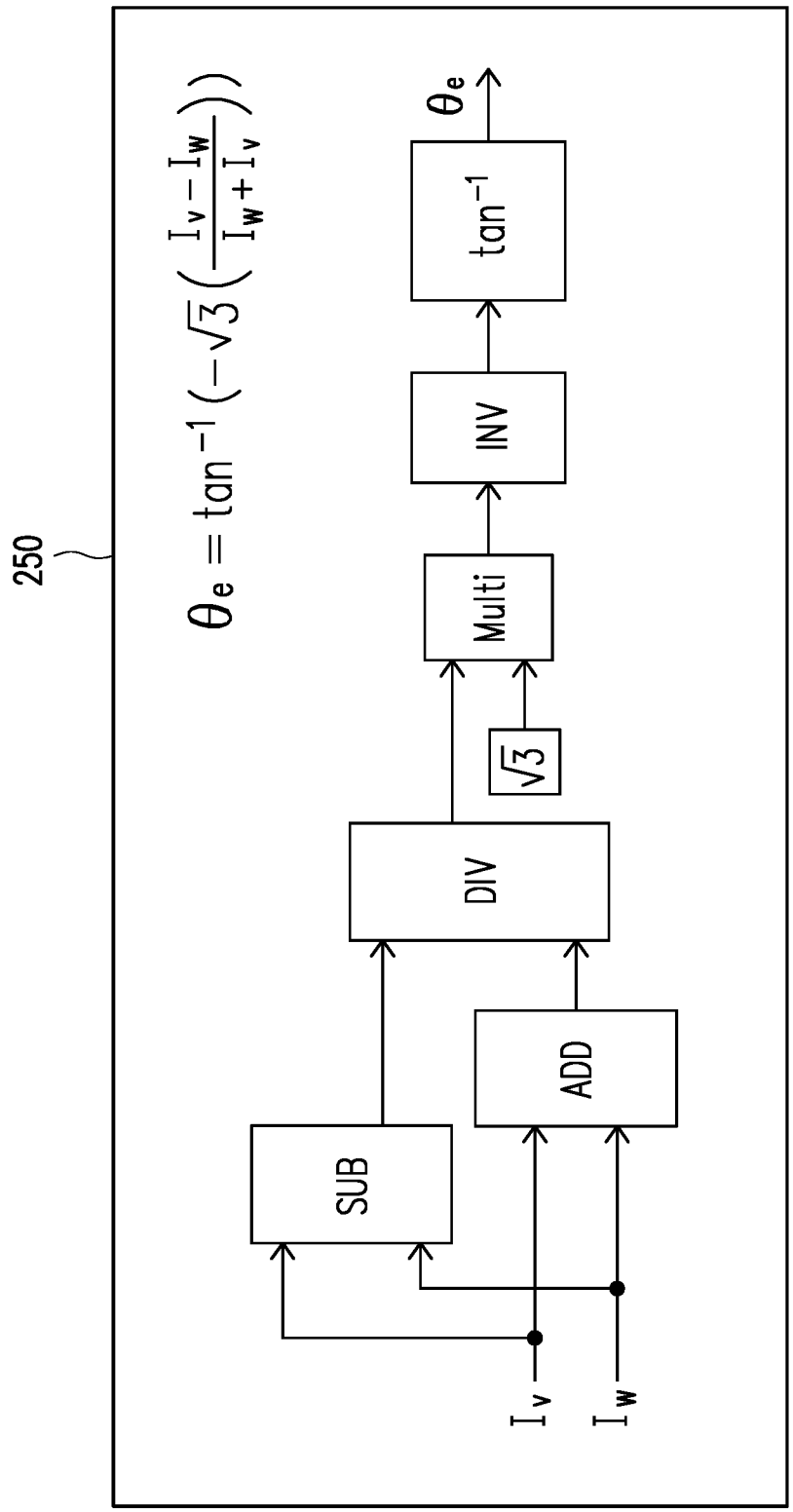
Figure 8C:
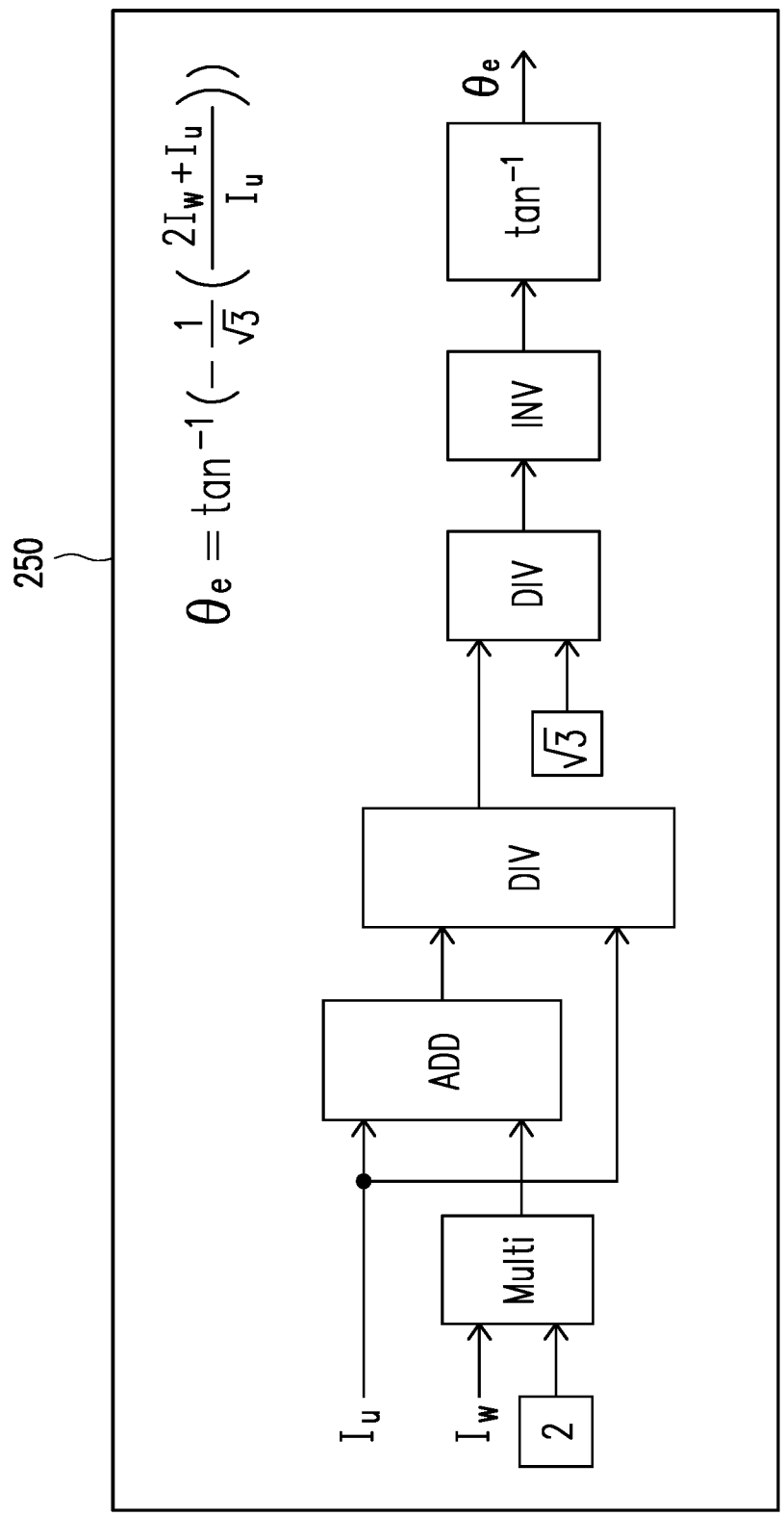

FIG. 8A to FIG. 8C are schematic block diagrams of a rotor angle calculation circuit according to Embodiment 3 of the invention. Referring to FIG. 8A, the rotor angle calculation circuit 250 may be implemented using a multiplication (Multi) unit, an addition (ADD) unit, a division (DIV) unit, and an arctangent (arctan, tan$^{-1}$) unit according to the foregoing formula (3-4).

For another example, the rotor angle calculation circuit 250 may directly calculate the real rotor angle $\theta_e$ according to the V-phase current value $I_V$ and the W-phase current value $I_w$ through the following formula (3-5):

$$\theta_e = \tan^{-1}\left(-\sqrt{3}\left(\frac{I_v - I_w}{I_w + I_v}\right)\right). \quad (3\text{-}5)$$

Referring to FIG. 8B, the rotor angle calculation circuit 250 may be implemented using a multiplication (Multi) unit, an addition (ADD) unit, a subtraction (SUB) unit, a division (DIV) unit, an inversion (INV) unit, and an arc tangent (arctan, tan$^{-1}$) unit according to the foregoing formula (3-5).

For another example, the rotor angle calculation circuit 250 may directly calculate the real rotor angle $\theta_e$ according to the U-phase current value $I_u$ and the W-phase current value $I_w$ through the following formula (3-6):

$$\theta_e = \tan^{-1}\left(-\frac{1}{\sqrt{3}}\left(\frac{2I_w + I_u}{I_u}\right)\right). \quad (3\text{-}6)$$

Referring to FIG. 8C, the rotor angle calculation circuit 250 may be implemented using a multiplication (Multi) unit, an addition (ADD) unit, a division (DIV) unit, an inversion (INV) unit, and an arc tangent (arctan, tan$^{-1}$) unit according to the foregoing formula (3-6).

Embodiment 4

A difference between Embodiment 4 and Embodiment 1 lies in an implementation of the rotor angle calculation circuit 250. Other hardware elements are the same as those of Embodiment 1, and therefore the descriptions thereof are omitted herein.

In particular, the rotor angle calculation algorithm implemented on the rotor angle calculation circuit 250 in Embodiment 4 defines relationships between the three phase current values $I_u$, $I_v$, and $I_w$ and the real rotor angle $\theta_e$ through the following formulas (4-1), (4-2), and (4-3):

$$I_u = \cos\theta_e, \quad (4\text{-}1)$$

$$I_v = \cos(\theta_e + 120) =$$
$$\cos\theta_e \cos 120 - \sin\theta_e \sin 120 = -\frac{1}{2}\cos\theta_e - \frac{\sqrt{3}}{2}\sin\theta_e, \text{ and} \quad (4\text{-}2)$$

-continued $$I_w = \cos(\theta_e + 240) = \qquad (4\text{-}3)$$
$$\cos\theta_e \cos 240 - \sin\theta_e \sin 240 = -\frac{1}{2}\cos\theta_e + \frac{\sqrt{3}}{2}\sin\theta_e.$$

$\theta_e$ is the real rotor angle with a unit of degree; $I_u$ is the U-phase current value, $I_v$ is the V-phase current value, and $I_w$ is the W-phase current value with a unit of ampere (A).

Similarly, with the relationships defined above, a formula for calculating the real rotor angle $\theta_e$ may be derived using two of the three phase current values $I_u$, $I_v$, and $I_w$.

For example, the rotor angle calculation circuit 250 may directly calculate the real rotor angle $\theta_e$ according to the U-phase current value $I_u$ and the V-phase current value $I_v$ through the following formula (4-4):

$$\theta_e = \tan^{-1}\left(-\frac{1}{\sqrt{3}}\left(\frac{I_u}{2I_v + I_u}\right)\right). \qquad (4\text{-}4)$$

Figure 9A:
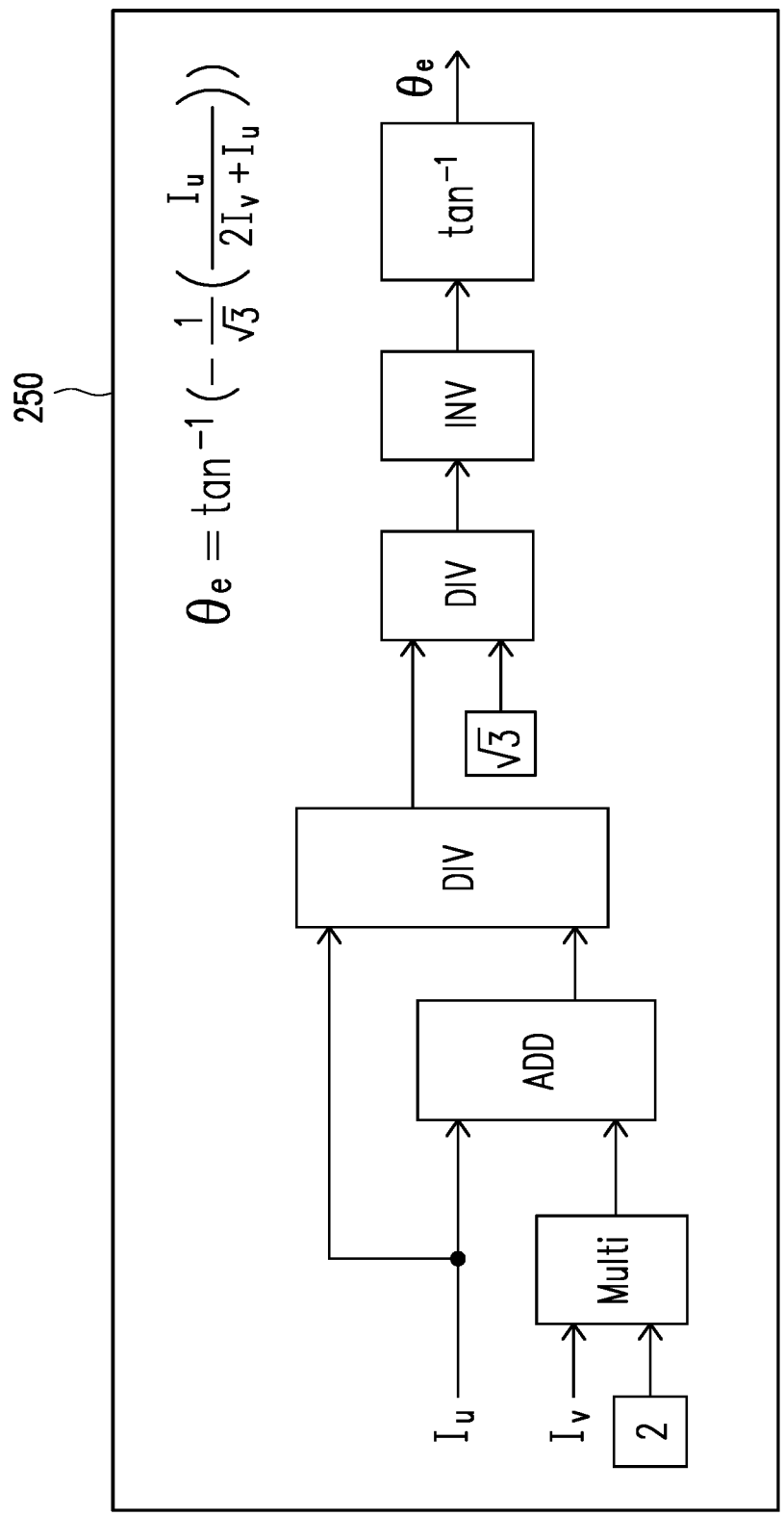
FIG. 9A to FIG. 9C are schematic block diagrams of a rotor angle calculation circuit according to Embodiment 4 of the invention.
Figure 9B:
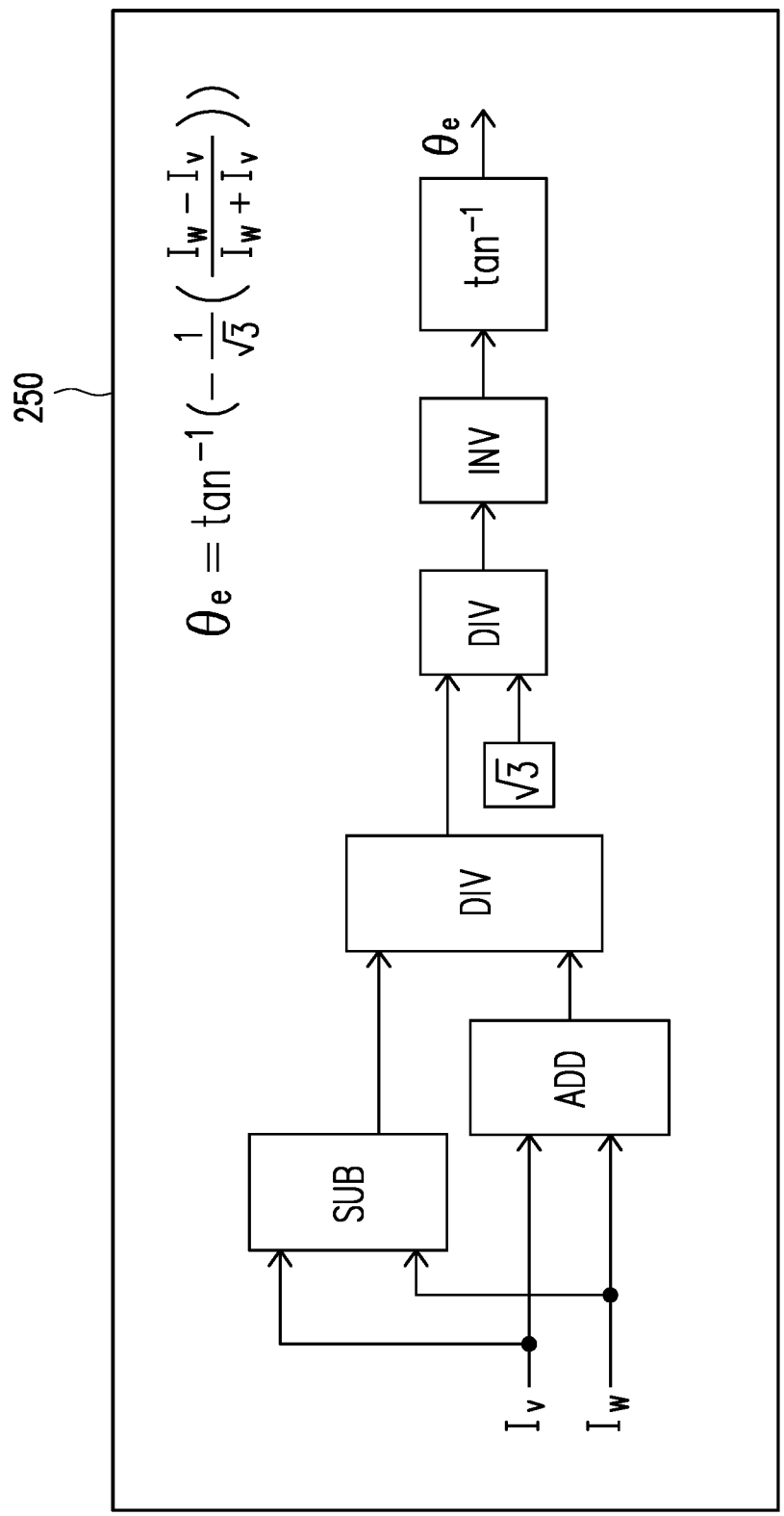
Figure 9C:
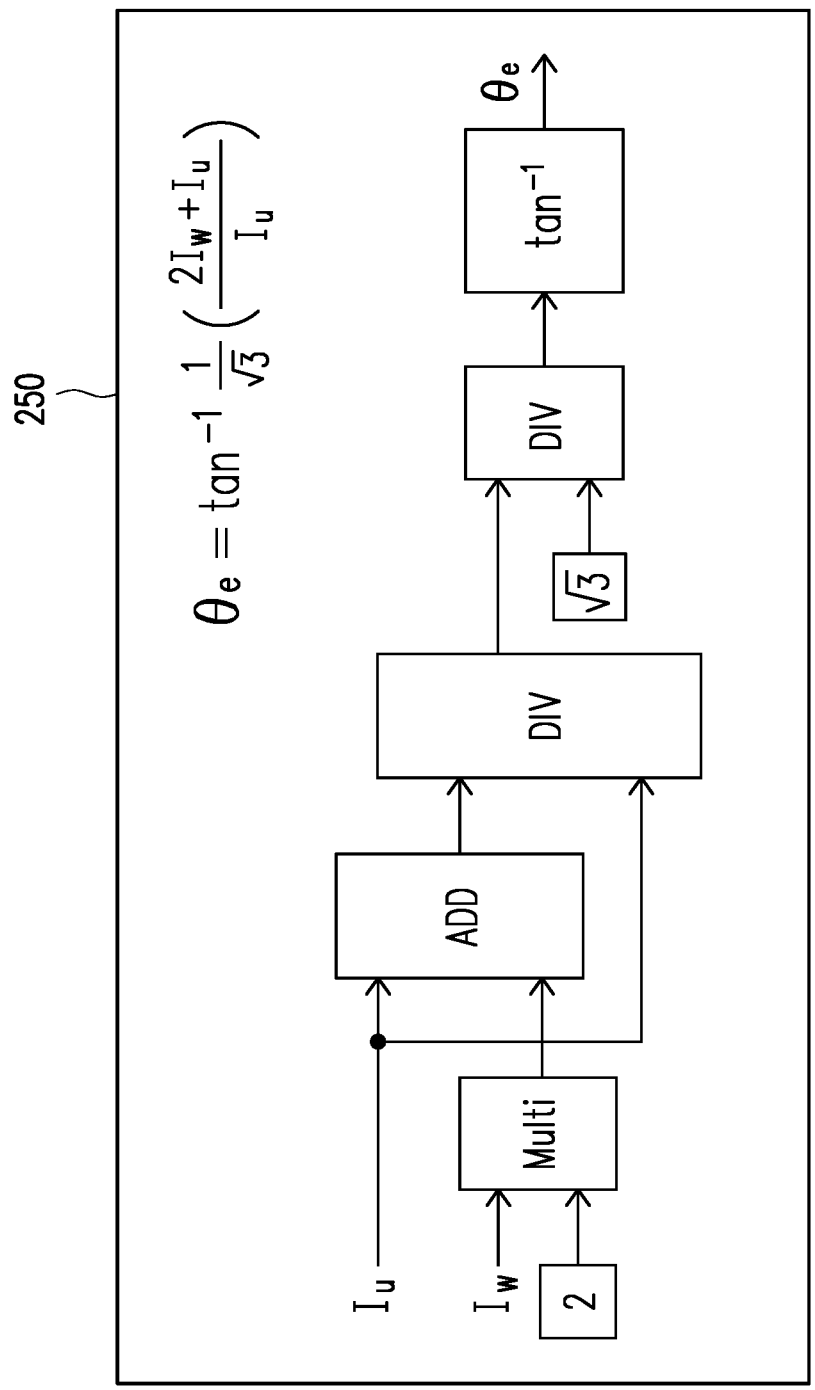

FIG. 9A to 9C are schematic block diagrams of a rotor angle calculation circuit according to Embodiment 4 of the invention. Referring to FIG. 9A, the rotor angle calculation circuit 250 may be implemented using a multiplication (Multi) unit, an addition (ADD) unit, a division (DIV) unit, an inversion (INV) unit, and an arctangent (arctan, $\tan^{-1}$) unit according to the foregoing formula (4-4).

For another example, the rotor angle calculation circuit 250 may directly calculate the real rotor angle $\theta_e$ according to the V-phase current value $I_V$ and the W-phase current value $I_w$ through the following formula (4-5):

$$\theta_e = \tan^{-1}\left(-\frac{1}{\sqrt{3}}\left(\frac{I_w - I_v}{I_w + I_v}\right)\right). \qquad (4\text{-}5)$$

Referring to FIG. 9B, the rotor angle calculation circuit 250 may be implemented using an addition (ADD) unit, a subtraction (SUB) unit, a division (DIV) unit, an inversion (INV) unit, and an arc tangent (arctan, $\tan^{-1}$) unit according to the foregoing formula (4-5).

For another example, the rotor angle calculation circuit 250 may directly calculate the real rotor angle $\theta_e$ according to the U-phase current value $I_u$ and the W-phase current value $I_w$ through the following formula (4-6):

$$\theta_e = \tan^{-1}\frac{1}{\sqrt{3}}\left(\frac{2I_w + I_u}{I_u}\right). \qquad (4\text{-}6)$$

Referring to FIG. 9C, the rotor angle calculation circuit 250 may be implemented using a multiplication (Multi) unit, an addition (ADD) unit, a division (DIV) unit, and an arc tangent (arctan, $\tan^{-1}$) unit according to the foregoing formula (4-6).

In summary, according to the motor controller and the motor control method in the embodiments of the invention, the three phase current values of the three-phase alternating current motor may be directly used to calculate the real rotor angle of the three-phase alternating current motor without utilizing a rotor angle sensor, so as to adjust the plurality of outputted voltage control signals according to the expected rotor speed and the calculated real rotor angle, thereby making the real rotor speed of the three-phase alternating current motor reach the expected rotor speed. In this way, not only hardware costs of the rotor angle sensor are reduced, but also the real rotor speed of the three-phase alternating current motor can still be controlled effectively through the calculated real rotor angle, thereby enhancing efficiency of the three-phase alternating current motor.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A motor controller, adapted to control a three-phase alternating current motor, wherein neither of the motor controller and the three-phase alternating current motor comprises a rotor angle sensor configured to sense a real rotor angle of the three-phase alternating current motor, and the motor controller comprises:
   a rotation speed controller;
   a pulse width modulation (PWM) circuit unit, configured to receive a plurality of voltage control signals from the rotation speed controller of the motor controller, so as to output a plurality of PWM signals;
   an inverter, configured to receive the plurality of PWM signals to output three phase currents to three stator windings of the three-phase alternating current motor, so that the three-phase alternating current motor rotates;
   a current sensing circuit, electrically connected to the inverter, wherein the current sensing circuit is configured to sense three phase current values of the three phase currents outputted to the three stator windings, wherein a phase difference of 120 degrees is provided among the three phase currents from each other, wherein the three phase current values comprise a U-phase current value, a V-phase current value, and a W-phase current value; and
   a rotor angle calculation circuit, configured to directly calculate the real rotor angle of the three-phase alternating current motor according to a trigonometric function relationship between the real rotor angle and two of the three phase current values,
   wherein the rotation speed controller is configured to adjust the plurality of the outputted voltage control signals according to the expected rotor speed and the calculated real rotor angle, so as to make the real rotor speed of the three-phase alternating current motor reach the expected rotor speed,
   wherein the U-phase current value (Iu), the V-phase current value (Iv), and the W-phase current value (Iw) are defined according to the following formulas (1), (2), and (3):

$$I_u = \sin\theta_e, \qquad (1)$$

$$I_v = \sin(\theta_e - 120) = \qquad (2)$$
$$\sin\theta_e \cos 120 - \cos\theta_e \sin 120 = -\frac{1}{2}\sin\theta_e - \frac{\sqrt{3}}{2}\cos\theta_e, \text{ and}$$

-continued $$I_w = \sin(\theta_e - 240) = \qquad (3)$$

$$\sin\theta_e \cos 240 - \cos\theta_e \sin 240 = -\frac{1}{2}\sin\theta_e + \frac{\sqrt{3}}{2}\cos\theta_e;$$

the following formulas (7), (8), and (9):

$$I_u = \sin\theta_e, \qquad (7)$$

$$I_v = \sin(\theta_e + 120) = \qquad (8)$$

$$\sin\theta_e \cos 120 + \cos\theta_e \sin 120 = -\frac{1}{2}\sin\theta_e + \frac{\sqrt{3}}{2}\cos\theta_e, \text{ and}$$

$$I_w = \sin(\theta_e + 240) = \qquad (9)$$

$$\sin\theta_e \cos 240 + \cos\theta_e \sin 240 = -\frac{1}{2}\sin\theta_e - \frac{\sqrt{3}}{2}\cos\theta_e;$$

the following formulas (13), (14), and (15):

$$I_u = \cos\theta_e, \qquad (13)$$

$$I_v = \cos(\theta_e - 120) = \qquad (14)$$

$$\cos\theta_e \cos 120 + \sin\theta_e \sin 120 = -\frac{1}{2}\cos\theta_e + \frac{\sqrt{3}}{2}\sin\theta_e, \text{ and}$$

$$I_w = \cos(\theta_e - 240) = \qquad (15)$$

$$\cos\theta_e \cos 240 + \sin\theta_e \sin 240 = -\frac{1}{2}\cos\theta_e - \frac{\sqrt{3}}{2}\sin\theta_e; \text{ or}$$

the following formulas (19), (20), and (21):

$$I_u = \cos\theta_e, \qquad (19)$$

$$I_v = \cos(\theta_e + 120) = \qquad (20)$$

$$\cos\theta_e \cos 120 - \sin\theta_e \sin 120 = -\frac{1}{2}\cos\theta_e - \frac{\sqrt{3}}{2}\sin\theta_e, \text{ and}$$

$$I_w = \cos(\theta_e + 240) = \qquad (21)$$

$$\cos\theta_e \cos 240 - \sin\theta_e \sin 240 = -\frac{1}{2}\cos\theta_e + \frac{\sqrt{3}}{2}\sin\theta_e,$$

wherein $\theta_e$ is the real rotor angle with a unit of degree, Iu is the U-phase current value, Iv is the V-phase current value, and Iw is the W-phase current value with a unit of ampere (A).

2. The motor controller according to claim 1, wherein the motor controller further comprises:
a rotor speed calculation circuit, configured to perform a differential operation on the real rotor angle to obtain the real rotor speed of the three-phase alternating current motor; and
a trigonometric function circuit, configured to calculate a sine function of the real rotor angle and a cosine function of the real rotor angle according to the real rotor speed.

3. The motor controller according to claim 2, wherein the rotation speed controller further comprises:
a first proportional-integral (PI) controller, configured to output a Q-axis current control signal according to the input expected rotor speed and the calculated rotor speed;
a second PI controller, configured to calculate a Q-axis voltage control signal according to the Q-axis current control signal and a Q-axis current feedback signal; and
a third PI controller, configured to calculate a D-axis voltage control signal according to a default D-axis current control signal and a D-axis feedback signal.

4. The motor controller according to claim 3, wherein the rotation speed controller performs a Park inverse transform operation according to the sine function and the cosine function of the real rotor angle, the Q-axis voltage control signal, and the D-axis voltage control signal to obtain a first voltage control signal and a second voltage control signal, and
the rotation speed controller performs a Clark inverse transform operation according to the first voltage control signal and the second voltage control signal to obtain a third voltage control signal, a fourth voltage control signal, and a fifth voltage control signal, wherein the third voltage control signal, the fourth voltage control signal, and the fifth voltage control signal are transmitted to the PWM circuit unit.

5. The motor controller according to claim 3, wherein the rotation speed controller performs a Clark transform operation according to the three phase current values to obtain a first current feedback signal and a second current feedback signal, and
the rotation speed controller performs a Park transform operation according to the first current feedback signal and the second current feedback signal, to obtain the D-axis current feedback signal and the Q-axis current feedback signal.

6. The motor controller according to claim 1, wherein in the operation of directly calculating, by the rotor angle calculation circuit, the real rotor angle of the three-phase alternating current motor according to the two of the three phase current values,
if the U-phase current value, the V-phase current value, and the W-phase current value are defined according to the formulas (1), (2), and (3), the rotor angle calculation circuit directly calculates the real rotor angle according to the U-phase current value and the V-phase current value through the following formula (4):

$$\theta_e = \tan^{-1}\left(-\sqrt{3}\left(\frac{I_u}{2I_v + I_u}\right)\right), \qquad (4)$$

if the U-phase current value, the V-phase current value, and the W-phase current value are defined according to the formulas (13), (14), and (15), the rotor angle calculation circuit directly calculates the real rotor angle according to the U-phase current value and the V-phase current value through the following formula (16):

$$\theta_e = \tan^{-1}\frac{1}{\sqrt{3}}\left(\frac{2I_v + I_u}{I_u}\right), \qquad (16)$$

or
if the U-phase current value, the V-phase current value, and the W-phase current value are defined according to the formulas (19), (20), and (21), the rotor angle calculation circuit directly calculates the real rotor angle according to the U-phase current value and the V-phase current value through the following formula (22):

$$\theta_e = \tan^{-1}\left(-\frac{1}{\sqrt{3}}\left(\frac{I_u}{2I_v + I_u}\right)\right). \quad (22)$$

7. The motor controller according to claim 1, wherein in the operation of directly calculating, by the rotor angle calculation circuit, the real rotor angle of the three-phase alternating current motor according to the two of the three phase current values, if the U-phase current value, the V-phase current value, and the W-phase current value are defined according to the formulas (1), (2), and (3), the rotor angle calculation circuit directly calculates the real rotor angle according to the V-phase current value and the W-phase current value through the following formula (5):

$$\theta_e = \tan^{-1}\sqrt{3}\frac{(I_w + I_v)}{(I_v - I_w)}, \quad (5)$$

if the U-phase current value, the V-phase current value, and the W-phase current value are defined according to the formulas (7), (8), and (9), the rotor angle calculation circuit directly calculates the real rotor angle according to the V-phase current value and the W-phase current value through the following formula (11):

$$\theta_e = \tan^{-1}\sqrt{3}\frac{(I_w + I_v)}{(I_w - I_v)}, \quad (11)$$

if the U-phase current value, the V-phase current value, and the W-phase current value are defined according to the formulas (13), (14), and (15), the rotor angle calculation circuit directly calculates the real rotor angle according to the V-phase current value and the W-phase current value through the following formula (17):

$$\theta_e = \tan^{-1}\left(-\sqrt{3}\left(\frac{I_v - I_w}{I_w + I_v}\right)\right), \quad (17)$$

and if the U-phase current value, the V-phase current value, and the W-phase current value are defined according to the formulas (19), (20), and (21), the rotor angle calculation circuit directly calculates the real rotor angle according to the V-phase current value and the W-phase current value through the following formula (23):

$$\theta_e = \tan^{-1}\left(-\frac{1}{\sqrt{3}}\left(\frac{I_w - I_v}{I_w + I_v}\right)\right). \quad (23)$$

8. The motor controller according to claim 1, wherein in the operation of directly calculating, by the rotor angle calculation circuit, the real rotor angle of the three-phase alternating current motor according to the two of the three phase current values, if the U-phase current value, the V-phase current value, and the W-phase current value are defined according to the formulas (1), (2), and (3), the rotor angle calculation circuit directly calculates the real rotor angle according to the U-phase current value and the W-phase current value through the following formula (6):

$$\theta_e = \tan^{-1}\sqrt{3}\left(\frac{I_u}{2I_w + I_u}\right), \quad (6)$$

if the U-phase current value, the V-phase current value, and the W-phase current value are defined according to the formulas (7), (8), and (9), the rotor angle calculation circuit directly calculates the real rotor angle according to the U-phase current value and the W-phase current value through the following formula (12):

$$\theta_e = \tan^{-1}\left(-\sqrt{3}\left(\frac{I_u}{2I_w + I_u}\right)\right), \quad (12)$$

if the U-phase current value, the V-phase current value, and the W-phase current value are defined according to the formulas (13), (14), and (15), the rotor angle calculation circuit directly calculates the real rotor angle according to the U-phase current value and the W-phase current value through the following formula (17):

$$\theta_e = \tan^{-1}\left(-\frac{1}{\sqrt{3}}\left(\frac{2I_w + I_u}{I_u}\right)\right), \quad (18)$$

and if the U-phase current value, the V-phase current value, and the W-phase current value are defined according to the formulas (19), (20), and (21), the rotor angle calculation circuit directly calculates the real rotor angle according to the U-phase current value and the W-phase current value through the following formula (24):

$$\theta_e = \tan^{-1}\frac{1}{\sqrt{3}}\left(\frac{2I_w + I_u}{I_u}\right). \quad (24)$$

9. A motor control method, adapted to control a three-phase alternating current motor by a motor controller, wherein neither of the motor controller and the three-phase alternating current motor comprises a rotor angle sensor configured to sense a real rotor angle of the three-phase alternating current motor, and the method comprises:

receiving a plurality of voltage control signals from a rotation speed controller of the motor controller through a pulse width modulation (PWM) circuit unit of the motor controller to output a plurality of PWM signals;

receiving the plurality of PWM signals through an inverter of the motor controller to output three phase currents to three stator windings of the three-phase alternating current motor, so that the three-phase alternating current motor rotates;

sensing, through a current sensing circuit of the motor controller, three phase current values of the three phase currents outputted to the three stator windings, wherein a phase difference of 120 degrees is provided among the three phase currents from each other, wherein the three phase current values comprise a U-phase current value, a V-phase current value, and a W-phase current value, and wherein the current sensing circuit is electrically connected to the inverter;

directly calculating the real rotor angle of the three-phase alternating current motor through a rotor angle calculation circuit of the motor controller according to a trigonometric function relationship between the real rotor angle and two of the three phase current values; and adjusting, through the rotation speed controller of the motor controller, the plurality of the outputted voltage control signals according to the expected rotor speed and the calculated real rotor angle, so as to make the real rotor speed of the three-phase alternating current motor reach the expected rotor speed, wherein the U-phase current value (Iu), the V-phase current value (Iv), and the W-phase current value (Iw) are defined according to the following formulas (1), (2), and (3):

$$I_u = \sin\theta_e, \quad (1)$$

$$I_v = \sin(\theta_e - 120) = \sin\theta_e \cos 120 - \cos\theta_e \sin 120 = -\frac{1}{2}\sin\theta_e - \frac{\sqrt{3}}{2}\cos\theta_e, \quad (2)$$

and $$I_w = \sin(\theta_e - 240) = \sin\theta_e \cos 240 - \cos\theta_e \sin 240 = -\frac{1}{2}\sin\theta_e + \frac{\sqrt{3}}{2}\cos\theta_e; \quad (3)$$

the following formulas (7), (8), and (9):

$$I_u = \sin\theta_e, \quad (7)$$

$$I_v = \sin(\theta_e + 120) = \sin\theta_e \cos 120 + \cos\theta_e \sin 120 = -\frac{1}{2}\sin\theta_e + \frac{\sqrt{3}}{2}\cos\theta_e, \quad (8)$$

and $$I_w = \sin(\theta_e + 240) = \sin\theta_e \cos 240 + \cos\theta_e \sin 240 = -\frac{1}{2}\sin\theta_e - \frac{\sqrt{3}}{2}\cos\theta_e; \quad (9)$$

the following formulas (13), (14), and (15):

$$I_u = \cos\theta_e, \quad (13)$$

$$I_v = \cos(\theta_e - 120) = \cos\theta_e \cos 120 + \sin\theta_e 120 = -\frac{1}{2}\cos\theta_e + \frac{\sqrt{3}}{2}\sin\theta_e, \quad (14)$$

and $$I_w = \cos(\theta_e - 240) = \cos\theta_e \cos 240 + \sin\theta_e \sin 240 = -\frac{1}{2}\cos\theta_e - \frac{\sqrt{3}}{2}\sin\theta_e; \text{ or} \quad (15)$$

the following formulas (19), (20), and (21):

$$I_u = \cos\theta_e, \quad (19)$$

$$I_v = \cos(\theta_e + 120) = \cos\theta_e \cos 120 - \sin\theta_e \sin 120 = -\frac{1}{2}\cos\theta_e - \frac{\sqrt{3}}{2}\sin\theta_e, \quad (20)$$

and $$I_w = \cos(\theta_e + 240) = \cos\theta_e \cos 240 - \sin\theta_e \sin 240 = -\frac{1}{2}\cos\theta_e + \frac{\sqrt{3}}{2}\sin\theta_e, \quad (21)$$

wherein $\theta_e$ is the real rotor angle with a unit of degree, Iu is the U-phase current value, Iv is the V-phase current value, and Iw is the W-phase current value with a unit of ampere (A).

\* \* \* \* \*